(12) United States Patent
Yokokawa et al.

(10) Patent No.: US 8,176,402 B2
(45) Date of Patent: May 8, 2012

(54) DECODING APPARATUS, DECODING METHOD, AND DECODING PROGRAM

(75) Inventors: Takashi Yokokawa, Kanagawa (JP); Yuichi Hirayama, Chiba (JP); Osamu Shinya, Tokyo (JP); Satoshi Okada, Tokyo (JP); Kazuhiro Oguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 1017 days.

(21) Appl. No.: 12/110,064

(22) Filed: Apr. 25, 2008

(65) Prior Publication Data

US 2008/0270876 A1 Oct. 30, 2008

(30) Foreign Application Priority Data

Apr. 27, 2007 (JP) ................ P2007-119095

(51) Int. Cl.
*H03M 13/00* (2006.01)

(52) U.S. Cl. .......... 714/800; 714/52; 714/701; 714/747; 714/751; 714/752; 714/755; 714/758; 714/790; 714/794; 714/780; 714/801

(58) Field of Classification Search ................ None
See application file for complete search history.

(56) References Cited

U.S. PATENT DOCUMENTS

| | | | | |
|---|---|---|---|---|
| 7,458,003 B2 * | 11/2008 | Pfister | ............... | 714/758 |
| 7,774,674 B2 * | 8/2010 | Wehn et al. | ............... | 714/752 |
| 2003/0053435 A1 * | 3/2003 | Sindhushayana et al. | .... | 370/342 |
| 2004/0163030 A1 * | 8/2004 | Haar et al. | ............... | 714/800 |
| 2005/0229091 A1 * | 10/2005 | Narayanan et al. | ......... | 714/801 |
| 2009/0265600 A1 * | 10/2009 | Matsumoto et al. | ......... | 714/752 |
| 2011/0122960 A1 * | 5/2011 | Vitale et al. | ............... | 375/261 |
| 2011/0167315 A1 * | 7/2011 | Kyung et al. | ............... | 714/752 |

FOREIGN PATENT DOCUMENTS

| | | | |
|---|---|---|---|
| JP | 2005-051469 | | 2/2005 |
| JP | 2007-036776 | | 2/2007 |
| JP | 2007-087529 | * | 4/2007 |
| JP | 2007-987529 | | 4/2007 |

OTHER PUBLICATIONS

R. G. Gallager, "Low Density Parity Check Codes", Cambridge, Massachusetts: M. I. T. Press, 1963.

D. J. C. MacKay, "Good Error Correcting Codes Based on Very Parse matrices", Submitted to IEEE Trans. Inf. Theory, IT-45, pp. 399-431, 1999.

M. G. Luby et al., "Analysis of Low Density Codes and Improved Designs Using Irregular Graphs", in Proceedings of ACM Symposium on Theory of Computing, pp. 249-258, 1998.

* cited by examiner

*Primary Examiner* — John Trimmings
(74) *Attorney, Agent, or Firm* — Finnegan, Henderson, Farabow, Garrett & Dunner, L.L.P.

(57) ABSTRACT

A decoding apparatus includes a memory and a receiving unit and is adapted to decode data in units of codewords each including a parity part. The memory has a storage capacity capable of storing at least data with a length equal to the length of one codeword. The receiving unit receives, as received values, elements of a codeword in a bit-interleaved form, performs bit deinterleaving and parity permutating on the received values, and stores the resultant received values in the memory.

9 Claims, 21 Drawing Sheets

BIT DEINTERLEAVE
8PSK

BIT DEINTERLEAVE
16APSK

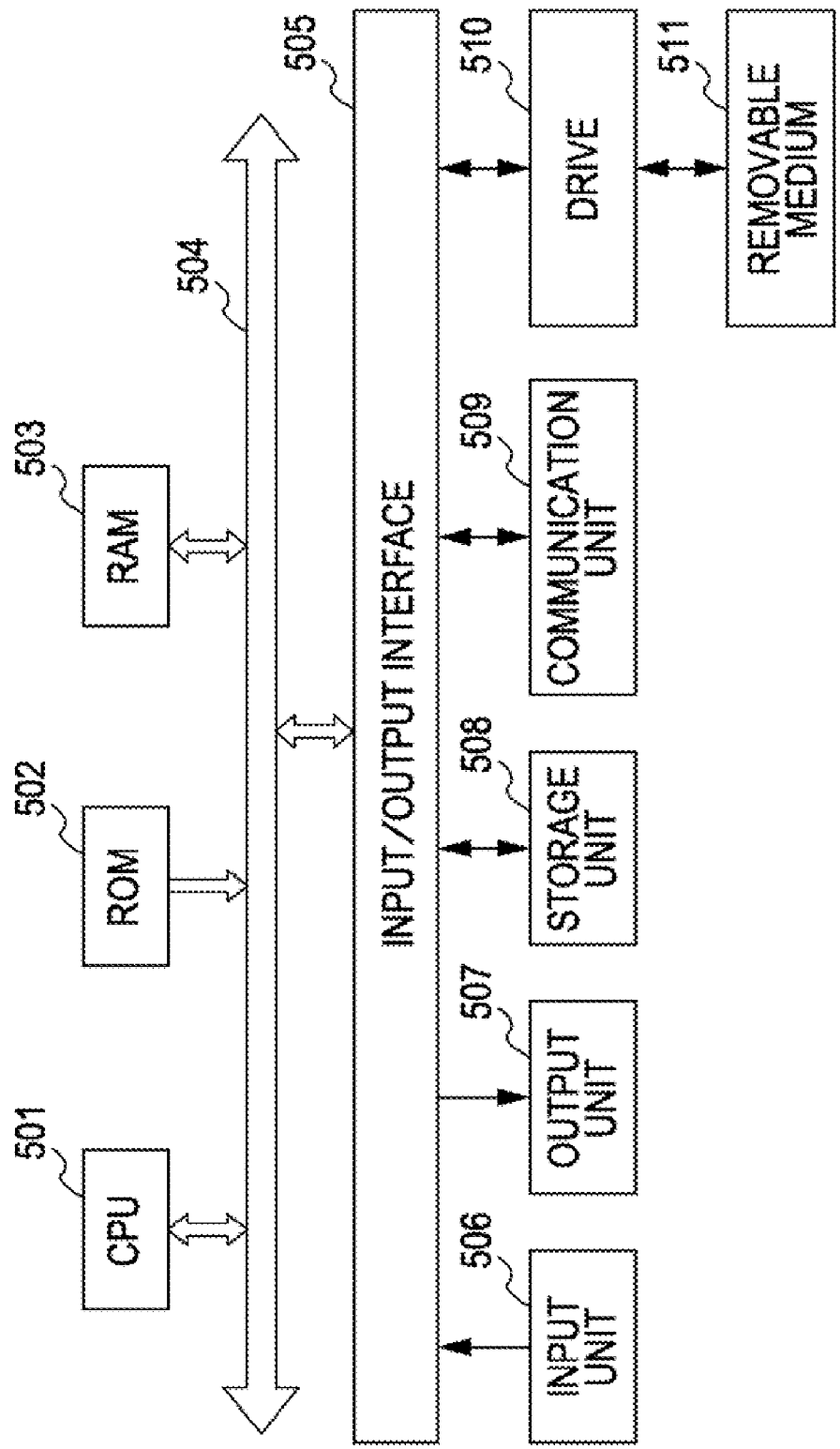

DECODING APPARATUS, DECODING METHOD, AND DECODING PROGRAM

CROSS REFERENCES TO RELATED APPLICATIONS

The present invention contains subject matter related to Japanese Patent Application JP 2007-119095 filed in the Japanese Patent Office on Apr. 27, 2007, the entire contents of which are incorporated herein by reference.

BACKGROUND OF THE INVENTION

1. Field of the Invention

The present invention relates to a decoding apparatus, a decoding method, and a decoding program, and more particularly, to a decoding apparatus, a decoding method, and a decoding program, which can be implemented in a low-complexity circuit configuration.

2. Description of the Related Art

In communication systems, coding is used to achieve high reliability even when communication is performed over a communication channel having noise. For example, wireless (radio) communication systems such as a satellite network are exposed to noise caused by geographical or environmental factors. Communication channels have a theoretical limit known as the Shannon's limit on the communication capacity represented by the number of bits per symbol for a particular signal-to-noise ratio. Coding algorithms are designed so as to achieve as high a rate as possible within the Shannon's limit. This requirement is important in particular in design of the coding algorithm for use in bandwidth-limited satellite systems.

Turbo code such as PCCC (Parallel Concatenated Convolutional Codes) codes or SCCC (Serially Concatenated Convolutional Codes) codes are used to achieve high performance close to the Shannon's limit. Low density parity check codes (LDPC) have been known for many decades. Recently, LDPC codes have significant attention because of its high performance rediscovered recently.

The LDPC coding was first proposed by R. G. Gallager in "Low Density Parity Check Codes" (R. G. Gallager, Cambridge, Mass., M. I. T. Press, 1963) and has been recently rediscovered by D. J. C. MacKay ("Good error correcting codes based on very parse matrices", Submitted to IEEE Trans. Inf. Theory, IT-45, pp. 399-431, 1999) and M. G. Luby, M. Mitzenmacher, M. A. Shokrollahi and D. A. Spielman ("Analysis of low density codes and improved designs using irregular graphs", in Proceedings of ACM Symposium on Theory of Computing, pp. 249-258, 1998).

Recent research studies have revealed that the performance of LDPC codes increases with the code length, and LDPC codes with sufficiently large length can provide good performance, similar to that of turbo codes, close to the Shannon's limit. LDPC codes have a feature that the minimum distance is proportional to the code length and thus low block error probabilities can be achieved. Besides, LDPC codes have substantially no error floors which can occur in decoding of turbo codes.

Because of the advantages described above, LDPC codes have been employed in the DVB-S.2 standard (established by ETSI (European Telecommunication Standard Institute) that will be a successor of the DVB-S standard currently employed in many countries world-wide.

A bit deinterleaving algorithm and a decoding algorithm of LDPC codes are described below using a specific example in which a transmitted signal according to the DVB-S.2 standards is received by a receiver. LDPC codes are linear code and they do not necessarily need to be binary. However, binary LDPC codes are used in the DVB-S.2 standard, and thus in the following discussion, it is assumed that LDPC codes used are binary.

FIG. 1 illustrates an example of a functional configuration of a transmitter according to the DVB-S.2 standard.

The transmitter includes a mode adapter 11, a stream adapter 12, an FEC encoder 13, a mapping unit 14, a physical layer scrambler and synchronization pilot signal insertion unit 110 and a modulator 111.

Each data output from each functional block is denoted by a combination of an alphabetic character D and a numeral so as to distinguish among data output from various functional blocks. Names of output data of blocks are not necessarily given such that the same name is given for output data in the same block. On the contrary, depending on the situation, the same name is used for output data of different blocks. When data are the same in symbol but different in name, these data are basically output data in the same functional block, but different names are used depending on the context. For example, different names are used depending on units being discussed. Conversely, when data are the same in name but different in symbol, the same name is used because the data are similar in feature, but different symbols are used because they are output from different functional blocks, that is, in this case, these data are not the same in the strict sense. This can occur, for example, for relocated data and its original data. Note that the manner of assigning names and symbols to data explained in this paragraph is applied to the entire description.

The transmitter according to the DVB-S.2 is explained below in terms of its functions.

An input stream D101 is supplied to the mode adapter 11 and is subjected to a process described below, and a result is output as a stream D106. Note that the input stream D101 may be a single input stream or a plurality of input streams.

The mode adapter 11 includes an input interface 101, a CRC-8 encoder 102, and a merger/slicer 103, and baseband header output unit 104.

In the mode adapter 11, the input stream D101 is input to the input interface 101 and output as a stream D102 from the input interface 101 to the CRC-8 encoder 102.

In the CRC-8 encoder 102, of the input stream D102 supplied from the input interface 101, a user packet part excluding a synchronization byte is CRC-8 encoded, and a user packet stream D103 obtained as a result of the CRC-8 encoding is supplied to the merger/slicer 103.

The CRC-8 encoded user packet stream D103 is sliced by the merger/slicer 103 and rewritten in a data field D104.

The user packet stream rewritten in the data field D104 is merged with a baseband header D105 output from the baseband header output unit 104. The result is output as a baseband frame D106 from the mode adapter 11 to the stream adapter 12.

In a baseband scrambler 105 of the stream adapter 12, the baseband frame D106 is scrambled in accordance with a pseudo random binary sequence generation polynomial. The resultant scrambled baseband frame D107 is supplied to the FEC encoder 13.

The FEC encoder 13 includes a BCH encoder 106, an LDPC encoder 107, and a bit interleaver 108.

The scrambled baseband frame D107 is supplied to the BCH encoder 106 in the FEC encoder 13 and is BCH-coded. The result is supplied as an output D108 to the LDPC encoder 107. In the LDPC encoder 107, the output D108 supplied from the BCH encoder 106 is LDPC-coded, and the result is supplied as an output D109 to the bit interleaver 108. In the bit interleaver 108, the output D109 supplied from the LDPC encoder 107 is bit-interleaved. As a result, an FEC frame D110 is obtained. The resultant FEC frame D110 is output from the FEC encoder 13 to the mapping unit 14. Note that for QPSK data, the bit interleaving is not performed.

The bit interleaving process is described in further detail below.

In the DVB-S.2 standard, two values are allowed as a code length n. One allowable value of the code length is 64800 bits, and this code length is referred to as a normal FEC frame length. The other one is 16200 bits and is referred to as a short FEC frame length. The length k of an information word to be subjected to LDPC coding is given by the product of the code length n and a coding rate r.

When the information word input to the LDPC encoder 107 is data of a sequence of bits taking a value of 0 or 1 with a length $k = P \times k_0$, and a codeword output from the LDPC encoder 107 is data of a sequence of bits taking a value of 0 or 1 with a total length $n = P \times n_0$ as shown in FIG. 2, a parity check matrix used by an LDPC decoding calculation unit (described later with reference to FIG. 6) has n−k rows and n columns and its element has a value of 0 or 1. In this parity check matrix, a part with a length of k on the left-hand side is referred to as an information part, and a part with a length of n−k on the right-hand side is referred to as a parity part.

In this case, the bit interleaving scheme used by the bit interleaver 108 is determined by the modulation scheme and the coding rate r.

More specifically, FIG. 3 illustrates a bit interleaving scheme for 8PSK data with the normal FEC frame length (64800 bits). FIG. 4 illustrates a bit interleaving scheme for 16APSK data with the normal FEC frame length (64800 bits). FIG. 5 illustrates a bit interleaving scheme for 32APSK data with the normal FEC frame length (64800 bits).

In FIGS. 3 to 5, the received value (D109 supplied from the LDPC encoder 107, in the example shown in FIG. 1) is written in a direction along columns as represented by solid arrows, and read out in a direction along rows as represented by dotted arrows and supplied to the mapping unit 14 (and finally to the FEC decoder). That is, in the bit interleaver 108, data is sequentially written in the direction along columns and sequentially read out in the direction along rows. However, exceptionally, for 8PSK data with a coding rate of ⅗, data is read out as represented by broken arrows in FIG. 3.

Each given codeword is arranged by the bit interleaver 108 into the form of a matrix, and each one of 3 to 5 boxes shown in FIGS. 3 to 5 denotes a column of the matrix in which one codeword is arranged. In any of FIGS. 3 to 5, the number of rows×the number of columns=64800.

More specifically, the number of columns is determined by the number of bits of one signal point (one symbol). For example, for 8 ($=2^3$) PSK data, the data is arranged in 3 columns as shown in FIG. 3. For 16 ($=2^4$) APSK data, the data is arranged in 4 columns as shown in FIG. 4. For 32 ($=2^5$) APSK data, the data is arranged in 5 columns as shown in FIG. 5. On the other hand, the number of rows is given by the quotient obtained by dividing 64800 by the number of columns. More specifically, for 8 ($=2^3$) PSK data, the data is arranged in 21600 rows as shown in FIG. 3. For 16 ($=2^4$) APSK data, the data is arranged in 16200 rows as shown in FIG. 4. For 32 ($=2^5$) APSK data, the data is arranged in 12960 rows as shown in FIG. 5.

Referring again to FIG. 1, the FEC frame D110 obtained as a result of the bit interleaving process performed by the bit interleaver 108 in the above-described manner is output from the FEC encoder 13 to a bit mapper 109 in the mapping unit 14 and mapped thereby in accordance with a predetermined modulation scheme. The data is then applied to the modulator 111 via the physical layer scrambler and synchronization pilot signal insertion unit 110 whereby the data is modulated. The resultant data is finally output as a transmit signal D113.

The transmit signal (the transmit signal D113 in the example shown in FIG. 1) transmitted from the transmitter configured as described above with reference to FIG. 1 is received by a receiver including a functional block adapted to perform an LDPC decoding on the received data. Hereinafter, this block will be referred to as an LDPC decoding apparatus. FIG. 6 illustrates an example of a configuration of such an LDPC decoding apparatus. In the example shown in FIG. 6, the LDPC decoding apparatus includes a demapping unit 151 and an LDPC decoder (including associated parts) 152.

The transmit signal (the transmit signal D113 in the example shown in FIG. 1) transmitted from the transmitter shown in FIG. 1 is input as a received value D201 to the receiver. In the receiver, the received value D201 is applied to a bit demapper 201 in the demapping unit 151. The bit demapper 201 demaps the received value D201 in accordance with the modulation scheme of the signal. The result is supplied as an output D202 to the LDPC decoder (including associated parts) 152.

More specifically, the LDPC decoder (including associated parts) 152 includes a bit deinterleaver 202 and an LDPC decoder 153. The output D202 from the bit demapper 201 is input to the bit deinterleaver 202.

In the bit deinterleaver 202, the output D202 from the bit demapper 201 is bit-interleaved. That is, the output D202 in the form interleaved by the bit interleaver 108 shown in FIG. 1 is deinterleaved into the original form, and the result is supplied as an output D203 from the bit deinterleaver 202 to the LDPC decoder 153.

The LDPC decoder 153 includes a receiving unit 203, an LDPC decoding calculation unit 204, and a decoded result memory 205.

The output D203 from the bit deinterleaver 202 is applied to the receiving unit 203 of the LDPC decoder 153. In the receiving unit 203, the data is subjected to a parity permutation process and is temporarily stored therein until the stored data reaches one codeword. Each time one codeword is obtained, the codeword is read out as output D204 from the receiving unit 203 and supplied to the LDPC decoding calculation unit 204.

The LDPC decoding calculation unit 204 performs an LDPC decoding calculation on the output D204 to obtain decoded data. The resultant decoded data D205 produced by the LDPC decoding calculation unit 204 is output as a decoded word D206 to the outside via the decoded result memory 205. In this process, in order for the LDPC decoder 153 to more precisely perform the LDPC decoding calculation, received values are generally in the form of soft values.

Referring to FIG. 6, the LDPC decoder (including associated parts) 152 in the receiver according to the DVB-S.2 standard is described in further detail below, in terms of their functions.

The bit deinterleaving performed by the bit deinterleaver 202 is a process inverse to bit interleaving performed by the bit interleaver 108 (FIG. 1). Therefore, the scheme of the bit deinterleaving process performed by the bit deinterleaver 202 depends on the modulation scheme and the coding rate r used on the transmitting end.

More specifically, FIG. 7 illustrates a bit deinterleaving scheme corresponding to the bit interleaving scheme shown in FIG. 3, that is, this bit deinterleaving scheme is used for 8PSK data with the normal FEC frame length (64800 bits).

FIG. 8 illustrates a bit deinterleaving scheme corresponding to the bit interleaving scheme shown in FIG. 4, that is, this bit deinterleaving scheme is used for 16APSK data with the normal FEC frame length (64800 bits). FIG. 9 illustrates a bit deinterleaving scheme corresponding to the bit interleaving scheme shown in FIG. 5, that is, this bit deinterleaving scheme is used for 32APSK data with the normal FEC frame length (64800 bits).

In FIGS. 7 to 9, the received value (D202 output from the bit demapper 201, in the example shown in FIG. 6) is written in a direction along rows as represented by solid arrows, and read out in a direction along columns as represented by dotted arrows and supplied to an FEC decoder (the LDPC decoder 153, in the specific example shown in FIG. 6).

In FIGS. 7 to 9, as in FIGS. 3 to 5, each given codeword is arranged by the bit deinterleaver 202 into the form of a matrix, and each one of 3 to 5 boxes denotes a column of the matrix in which one codeword is arranged. In any of FIGS. 7 to 9, the number of rows×the number of columns=64800.

More specifically, the number of columns is determined by the number of bits of one signal point (one symbol). For example, for 8 ($=2^3$) PSK data, the data is arranged in 3 columns as shown in FIG. 7. For 16 ($=2^4$) APSK data, the data is arranged in 4 columns as shown in FIG. 8. For 32 ($=2^5$) APSK data, the data is arranged in 5 columns as shown in FIG. 9. On the other hand, the number of rows is given by the quotient obtained by dividing 64800 by the number of columns. More specifically, for 8 ($=2^3$) PSK data, the data is arranged in 21600 rows as shown in FIG. 7. For 16 ($=2^4$) APSK data, the data is arranged in 16200 rows as shown in FIG. 8. For 32 ($=2^5$) APSK data, the data is arranged in 12960 rows as shown in FIG. 9.

That is, in the bit deinterleaving process, as described above with reference to FIGS. 7 to 9, data is sequentially written in the direction along rows and sequentially read out in the direction along columns. However, exceptionally, for 8PSK data with a coding rate of ⅗, data is written as represented by broken arrows in FIG. 9.

More specifically, for 8PSK data with the normal FEC frame length (64800 bits), the matrix structure shown in FIG. 7 has 21600 rows×3 columns (each element corresponds to 1 bit). In this structure, one received symbol is written in one row (with a length of 3 bits), while reading is performed column by column.

If the bit deinterleaver 202 is configured such that reading and writing from/to a single storage unit is performed at the same time, a new value is written in the direction along rows before reading in the direction along columns is completed. This can cause an error to occur in the reading operation, and thus correct data is not supplied to the LDPC decoder 153. Thus, to avoid the above problem, the actual bit deinterleaver 202 has two storage units 221 and 222 disposed in parallel as shown in FIG. 10 or 11, and reading and writing are performed alternately for these two storage units 221 and 222 such that when reading is performed to one storage unit, writing is performed to the other thereby preventing data being read out from being overwritten.

In general, a RAM (Random Access Memory) capable of writing/reading data to/from an arbitrary specified address is used as the storage devices 221 and 222.

In the above-described receiver according to the DVB-S.2 standard, the bit deinterleaving process is performed by the bit deinterleaver 202 disposed outside the LDPC decoder 153.

Referring again to FIG. 6, after being subjected to the bit deinterleaving process by the bit deinterleaver 202, the data is output as data D203 from the bit deinterleaver 202 and supplied to the LDPC decoder 153. The LDPC decoder 153 performs LDPC-decoding on the received data D203.

More specifically, the LDPC decoder 153 performs LDPC decoding using a parity check matrix with n−k rows and n columns whose elements take a value of 0 or 1, where n−k=P×($n_0$−$k_0$) and n=P×$n_0$. In this process, the LDPC decoder 153 regards a part with a length k=P×$k_0$ on the left-side of the parity check matrix as an information part, and the remaining part with a length n−k=P×($n_0$−$k_0$) as a parity part.

Note that the LDPC decoding calculation process is performed using a parity check matrix in the form of an array of zero matrices, matrices obtained by cyclically shifting a P×P unit matrix, and/or matrices obtained by adding arbitrary such matrices, by using a parity check matrix that can be changed into such a form via row/column permutation, the LDPC decoding process can be performed at a high speed by configuring the LDPC decoding calculation unit 204 so as to include P calculation units and by using these P calculation units in parallel.

Parity check matrices used in the DVB-S.2 systems can be converted, by row/column permutation, into matrices of the form described above.

In view of the above, in order to achieve high-speed LDPC decoding using P parallel operation units, the LDPC decoder 153 according to the DJB-S.2 standard performs row/column permutation to convert a given original parity check matrix into the above-describe form.

If the parity check matrix is subjected to the row/column permutation, the resultant parity check matrix has a different parity part from that of the original parity check matrix, although the information part remains unchanged. Note that there is a particular relation between column numbers before and after the column permutation. That is, if the columns in the parity part are numbered such that the first column in the parity part is referred to as a 0th column, (($n_0$−$k_0$)×i+j)th columns (0≦i≦P−1 and 0≦j≦$n_0$−$k_0$−1) before the column permutation are moved into (P×j+i)th columns via the column permutation.

Therefore, in this scheme, it is required that the received values should also be treated in the order corresponding to the column$_{permutation}$. More specifically, when the received values are subjected to the LDPC decoding calculation process (by the LDPC decoding calculation unit 204 shown in FIG. 6), the received values located in the original columns are moved into the permutated columns.

Therefore, when received values supplied as the output D203 from the bit deinterleaver 202 are written in the receiving unit 203 of the LDPC decoder 153, the received values are relocated into the order of permutated columns so that the parity check matrix obtained via the parity permutation can be applied to the received values. This process of relocating the locations of received values performed by the receiving unit 203 is referred to as parity permutation.

For example, when a code represented by a parity check matrix shown in FIG. 12 is LDPC-decoded, the parity permutation is performed as follows.

Note that in FIG. 12, elements of "0" in the parity check matrix are denoted by ".", and also note that the code expressed by the parity check matrix shown in FIG. 12 has a code length of 108 and a coding rate r=⅔, and thus n=108 and k=72.

In FIG. 13, the parity check matrix shown in FIG. 12 is expressed in the form of a collection of submatrices each having 6 (=P) rows and 6 (=P)columns (hereinafter, each submatrix will be denoted as 6×6 submatrix). These 6×6 (P×P) submatrices include the following types: 6×6 unit matrices; matrices obtained by replacing one of 1s in a 6×6 unit matrices by 0; matrices produced by cyclic shift of one of the above matrices; matrices produced by the sum of some of the above matrices; and 6×6 matrices whose elements are all 0.

That is, the parity check matrix shown in FIG. 13 is obtained by arranging 6×6 submatrices of the above-described types such that as many submatrices as $n_0-k_0=n/P-k/P=6$ are arranged in the vertical direction, and as many submatrices as $n_0=n/P=18$ are arranged in the horizontal direction.

Note that the matrix shown in FIG. 13 is in a state in which the column permutation has been carried out, and thus the order of columns in the parity part is different from the order in a state in which the column permutation is not yet carried out.

On the left-hand side of FIG. 14, shown is a parity part which is not yet subjected to the row/column permutation. On the right-hand side of FIG. 14, shown is a parity part in a row/column-permutated form. FIG. 15 illustrates, in an enlarged manner, the parity part shown on the left-hand side of FIG. 14 which is not yet subjected to the row/column permutation. FIG. 16 illustrates a parity part which has already been subjected to row permutation but not yet column permutation. FIG. 17 illustrates a parity part which has already been subjected to row permutation and further column permutation, that is, this figure shows, in an enlarged form, the parity shown on the right-hand side of FIG. 14.

As can be seen by comparing FIGS. 16 and 17, columns located in $((n_0-k_0)\times i+j)$th positions, i.e., $(6\times i+j)$th positions are moved into $(P\times j+i)$th positions, i.e., $(6\times j+i)$th positions via the column permutation, where $0 \leq i \leq P-1=5$ and $0 \leq j \leq n_0-k_0-1=5$.

In order for the parity check matrix subjected to column permutation to work in the intended manner as described above, the parity part of the received value should be permutated such that data located in a $((n_0-k_0)\times i+j)$th position, i.e., $(6\times i+j)$th position is moved into a $(P\times j+i)$th position, i.e., $(6\times j+i)$th position for all values of i and j satisfying $0 \leq i \leq P-1=5$ and $0 \leq j \leq n_0-k_0-1=5$, where data are numbered starting from 0 for the first data of the parity part of the received value.

A specific example of a parity permutation scheme is described below.

In the above-described receiver (FIG. 6) according to the DVB-S.2 standard, the parity permutation is carried out by the receiving unit 203 of the LDPC decoder 153.

Now, implementation of the P=6 parallel LDPC decoding calculation by the LDPC decoding calculation unit 204 of the LDPC decoder 153 is discussed below. To achieve the implementation, the LDPC decoding calculation unit 204 is assumed to include six calculation units adapted to perform the LDPC decoding calculation process in parallel. Hereinafter, a set of these six calculation units will be collectively referred to as a 6 parallel LDPC decoding calculation unit.

A codeword is represented by a parity check matrix. On the top of FIG. 18, shown is a codeword represented by the example of the parity check matrix shown in FIG. 13. The receiving unit 203 of the LDPC decoder 153 has a storage device 231 including a RAM having a configuration with a horizontal size corresponding to a word-length of 108/6=18 and a vertical size that allows as many received values as P=6 to be stored per word and thus having a total storage capacity of 30 bits×18 words, as shown on the bottom of FIG. 18. Hereinafter, this storage device 231 will also be referred to as a received value memory 231.

When received values each quantized in 5 bits are serially input in the form of soft values to the received value memory 231, and written until one complete codeword is written in the received value memory 231. In the reading operation, received values are read out from the received value memory 231 in parallel in a word-by-word basis, that is, 6 received values are read out in parallel at the same time for each word (each ellipse Ru shown on the bottom of FIG. 18 denotes one word including 6 received values). Thus 6 received values of each word are simultaneously input to the LDPC decoding calculation unit 204 word by word, thereby allowing the 6 parallel LDPC decoding calculation unit of the LDPC decoding calculation unit 204 to perform the LDPC decoding calculation process in a parallel manner.

For convenience in the following explanation, an unit called a bit-direction number is introduced herein.

That is, the received value memory 231 is equally divided into P parts in the direction along the bit width, and the respective parts are numbered $0, 1, \ldots, P-1$ starting from the most significant bit (MSB). The numbers defined in this manner are referred to as bit-direction numbers. Thus, received values in the form of soft values are serially stored in the received value memory 231 such that one received value is stored in one of P zones (each assigned one bit-direction number).

More specifically, in the present example, as shown on the bottom of FIG. 18, the received value memory 231 with a width of 30 bits is equally divided every 5 bits into P=6 parts in the direction along the width, and the respective parts are numbered $0, 1, \ldots, P-1$ starting from the most significant bit (MSB). Thus, bit-direction numbers are defined.

As shown on the top of FIG. 18, the elements of one codeword supplied from the receiving unit 203 are serially numbered starting from 0 for the first element. That is, the first element is numbered 0, and the number is incremented by 1 element by element for the following elements. Hereinafter, the codeword read out from the receiving unit 203 will be referred to as an output codeword, and numbered elements of the output codeword will be referred to as data elements. In the following discussion, received values correspond to particular data elements of the output codeword.

To write received values, which are serially input to the receiving unit 203, at correct locations in the received value memory 231, the received value memory 231 in the receiving unit 203 is realized using a partially writable RAM capable of storing data at any specified location.

In the received value memory 231, the data elements of the output codeword are written at storage locations denoted by numerals in a box shown on the bottom of FIG. 18 illustrating the structure of the received value memory 231. That is, the data elements of the output codeword are sequentially written in the received value memory 231 in ascending order of the bit-direction number. More specifically, a $(P\times x+y)$th data element of the output codeword is written in the received value memory 231 at a location (x, y) where x is the bit-direction number and y is the word-direction address.

In the receiving unit 203 having the received value memory 231 configured in the above-described manner, the parity permutation process is performed as follows.

Received values from the first arrival to a kth arrival to the receiving unit 203 as counted starting from the first received value of the received word correspond to the information part. For such received values corresponding to the information part, writing on the received value memory 231 is performed such that the received values are simply stored sequentially in the same order as the arrival order starting with the first data element of the codeword.

In the present case, k=72, and thus, for example, a received value of a 60th arrival as counted starting from the first received value of the received word is a received value of an arrival before the kth i.e., 72th arrival, and thus this received value belongs to the information part. Therefore, this received value belonging to the information part is stored in the received value memory 231 at a 60th location as counted from the location for the first data element of the codeword.

On the other hand, received values in the range from the kth one as counted with respect to the first received value of the received word and those following the kth one, that is, received values whose arrival order is given by $k+(n_0-k_0)\times i+j=72+6\times i+j$ correspond to the parity part. Therefore, the received values corresponding to the parity part with the above-described arrival order, that is, $k+(n_0-k_0)\times i+j=72+6\times i+j$, are simply stored in the received value memory 231 at locations of $k+P\times j+i=72+6\times j+i$.

For example, a received value of an arrival number of $k+(n_0-k_0)\times 2+1=72+6\times 2+1=85$ as counted with respect to the first received value of the received word belongs to the parity part, and thus this received value is stored in the received value memory 231 at a location of $k+P\times 1+1=72+6\times 1+2=80$ as counted with respect to the location for the first data element of the codeword.

Because the data elements of the output codeword are sequentially written in the received value memory 231 in ascending order of the bit-direction number as described above, a $(P\times x+y)$th data element of the output codeword is written in the received value memory 231 at a location (x, y) where x is the bit-direction number and y is the word-direction address.

From the point of view of the writing process, the received word is serially input to the receiving unit 203. Therefore, received values from the value of the first arrival value to a value of a kth arrival to the receiving unit 203 as counted starting from the first received value of the received word correspond to the information part. Thus, as shown on the top of FIG. 19, as long as the input received values are those belonging to the information part, the received values are simply written sequentially in the bit direction.

In the structure of the received value memory 231 shown on the top FIG. 19, numerals in a box indicate the serial arrival order of the received values of the received word arriving at the receiving unit 203. On the other hand, in the structure of the received value memory 231 shown on the bottom of FIG. 19, as with the diagram shown on the bottom of FIG. 18, numerals in a box indicate the serial numbers assigned to the respective data element of the output codeword (the serial numbers assigned to the respective storage locations) read from the received value memory 231 and supplied to the LDPC decoding calculation unit 204 (FIG. 6).

The writing operation is explained in further detail below with reference to the diagram on the top of FIG. 19 in conjunction with a numerals described in the diagram on the bottom of FIG. 19. The received values of $(P\times x+y)$th arrival, $(P\times x+y+1)$th arrival, . . . as counted starting from the first received value of the received value, that is, the received values corresponding to the information part are directly written at locations of x, x, . . . in word-direction address and y, y+1, . . . in bit-direction number. For example, as can be seen from the figures on the top and the bottom of FIG. 19, received values of 60th and 61st arrivals (see the diagram on the top of FIG. 19) as counted starting from the first received value of the received word are written at simply corresponding storage locations for the 60th and 61st data elements (see the diagram on the bottom of FIG. 19) of the output codeword.

Subsequently, received values corresponding to the parity part arrive. For these received values, writing is performed as follows. That is, received values of $(k+(n_0-k_0)\times i+j)$th arrival, $(k+(n_0-k_0)\times i+j+1)$th arrival, . . . corresponding to the parity part are written at locations of $k_0+j$, $k_0+j+1$, . . . in word-direction address and i, i, . . . in bit-direction number on the received value memory 231. That is, the received values corresponding to the parity part are sequentially written in the word direction on the received value memory 231, thereby achieving the parity permutation.

For example, in FIG. 19, a received value of $(k+(n_0-k_0)\times 2+1)=72+6\times 2+1=85$th arrival and a received value of $(k+(n_0-k_0)\times 2+2)=72+6\times 2+2=86$th arrival are written in the word direction on the received value memory 231 as can be seen from the diagram on the top of FIG. 19. In this case, it can be seen from the diagram on the bottom of FIG. 19 that the writing locations of the received values of 85th, 86th, . . . arrivals (denoted by numerals 85, 86, . . . in the diagram on the top of FIG. 19) corresponds to the storage locations (denoted by numerals 80, 86, . . . in the diagram on the bottom of FIG. 19) for $k+P\times 1+2=72+6\times 1+2=80$th, $k+P\times 2+2=72+6\times 2+2=86$th data elements and so on of the output codeword.

By writing the received values serially input to the receiving unit 203 at particular locations on the received value memory 231 in the above-described manner, it becomes possible to achieve the parity permutation corresponding to the column-permutation of the parity check matrix.

After one codeword is completely written via the above-described process including the parity permutation process, the received values are read from the received value memory 231 in parallel in units of words (consisting of 6 received values) each located in one of columns (ellipses) Ru shown in the diagram on the bottom of FIG. 18 and supplied to the LDPC decoding calculation unit 204 thereby making it possible for the 6 parallel LDPC decoding calculation unit in the LDPC decoding calculation unit 204 to perform the LDPC decoding calculation in parallel.

To achieve the above-described parity permutation process, it is required that the received values should be serially input to the receiving unit 203 and the receiving unit 203 should have the storage device 231 (such as a partially writable received value memory 231) capable of storing serially input received values at any specified storage locations.

Referring again to FIG. 6, after the bit deinterleaving by the bit deinterleaver 202 and the parity permutation by the receiving unit 203, the resultant deinterleaved received value D204 is input to the LDPC decoding calculation unit 204, subjected to the LDPC decoding calculation process, and the result is output as a decoded result D205.

In the above process, the LDPC decoding calculation unit 204 uses the matrix whose parity part is permuted in the above-described manner. Therefore, the parity part of received values is used in the order corresponding to the permutation in the LDPC decoding calculation process, and the result is output as decoded result D205 in the corresponding order. That is, the decoded result D205 obtained as a result of the LDPC decoding calculation process is in the order of the column number corresponding to the column permutation.

Therefore, before a decoded word D206 is output from the decoded result memory 205, it is required to re-arrange the order of the decoded result D205 into the original column order in the state not yet column-permutated. That is, the decoded result D205 provided by the LDPC decoding calculation unit 204 is stored in the decoded result memory 205 in the permutated column order. Thus, the rearrangement is carried out, and the decoded word D206 is output in the original column order in the state not subjected to the column permutation.

Note that no change occurs in terms of column order in the information part via the LDPC decoding calculation process performed by the LDPC decoding calculation unit 204. However, a change occurs in the parity part. Therefore, it is necessary to perform a process inverse to the parity permutation described above to rearrange the parity part in an order opposite to the order in which the parity permutation is performed so as to rearrange the decoded result into the original order of column numbers not yet subjected to the column permutation thereby obtaining the decoded word D206 having the same order of column numbers as the original order.

As described above, the LDPC decoder 153 includes the received value memory (the received value memory 231 in the receiving unit 203 shown in FIG. 18) having the storage capacity corresponding to the code length and the decoded result memory 205 whereby received values are stored in the parity-permutated form in the received value memory and the decoded result is read out in the inversely parity-permutated from the decoded result memory 205. At a stage in front of the LDPC decoder 153, there is disposed the bit deinterleaver 202 including two received value memories (the storage devices 221 and 222 shown in FIG. 10 or 11) each having a storage capacity corresponding to the code length.

SUMMARY OF THE INVENTION

In the LDPC decoding process, received values given are in the form of soft values, and thus, to achieve high accuracy in the LDPC decoding process, it is required that the received values are represented in sufficiently large number of quantization bits. Thus, the received value memory in the receiving unit 203 and the received value memory in the bit deinterleaver 202 need to have a large storage capacity to store the received values.

In particular, when codes have a long length as is the case with codes used in the DVB-S.2 standard, the requirement for the large storage capacity of the received value memories leads to an increase in circuit complexity, which can cause a serious problem.

In view of the above, it is desirable to achieve an LDPC decoding apparatus without increasing the circuit complexity.

According to an embodiment of the present invention, there is provided a decoding apparatus adapted to decode data in units of codewords each including a parity part, including storage means having a storage capacity capable of storing at least data with a length equal to the length of one codeword, and receiving means for receiving, as a received value, each element of a codeword in a bit-interleaved form, performs bit deinterleaving and parity permutation on the received values, and stores the resultant received values in the memory.

The received values corresponding to the elements of the codeword may be serially input to the receiving means.

The storage means may be configured to store each received value at an arbitrary storage location.

Each received value may be in the form of a soft value.

The decoding apparatus may be adapted to decode an LDPC (Low Density Parity-Check code) code.

The storage means may include a RAM (Random Access Memory).

According to an embodiment of the present invention, there is provided a decoding method for a decoding apparatus adapted to decode data in units of codewords each including a parity part, comprising the steps of, in the decoding apparatus including a memory having a storage capacity capable of storing at least data with a length equal to the length of one codeword, receiving, as received values, elements of a codeword in a bit-interleaved form, performing bit deinterleaving and parity permutating on the received values, and storing the resultant received values in the memory.

According to an embodiment of the present invention, there is provided a program executable by a computer to perform a process of decoding data in units of codewords each including a parity part, the process including the steps of, receiving, as received values, elements of a codeword in a bit-interleaved form, performing bit deinterleaving and parity permutating on the received values, and storing the resultant received values in a memory disposed in the computer or any other apparatus and having a storage capacity capable of storing at least data with a length equal to the length of one codeword.

Thus, the present invention provides the low-complexity decoding apparatus adapted to decode data in units of bit-interleaved codewords each including a parity part.

BRIEF DESCRIPTION OF THE DRAWINGS

FIG. 25 is a diagram illustrating an example of a configuration of a computer on which a decoding apparatus is implemented according to an embodiment of the present invention.

DESCRIPTION OF THE PREFERRED EMBODIMENTS

Before describing an embodiment of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the invention, that does not necessarily mean that the element does not relate to other features of the invention.

Also note that it should be understood that some examples described in the embodiments can correspond to no claims. In other words, there can be a claim that correspond to an example described in the embodiments but that is not included in the current claims, that is, there can be a future claim presented by means of division or amendment of application.

Figure 18:
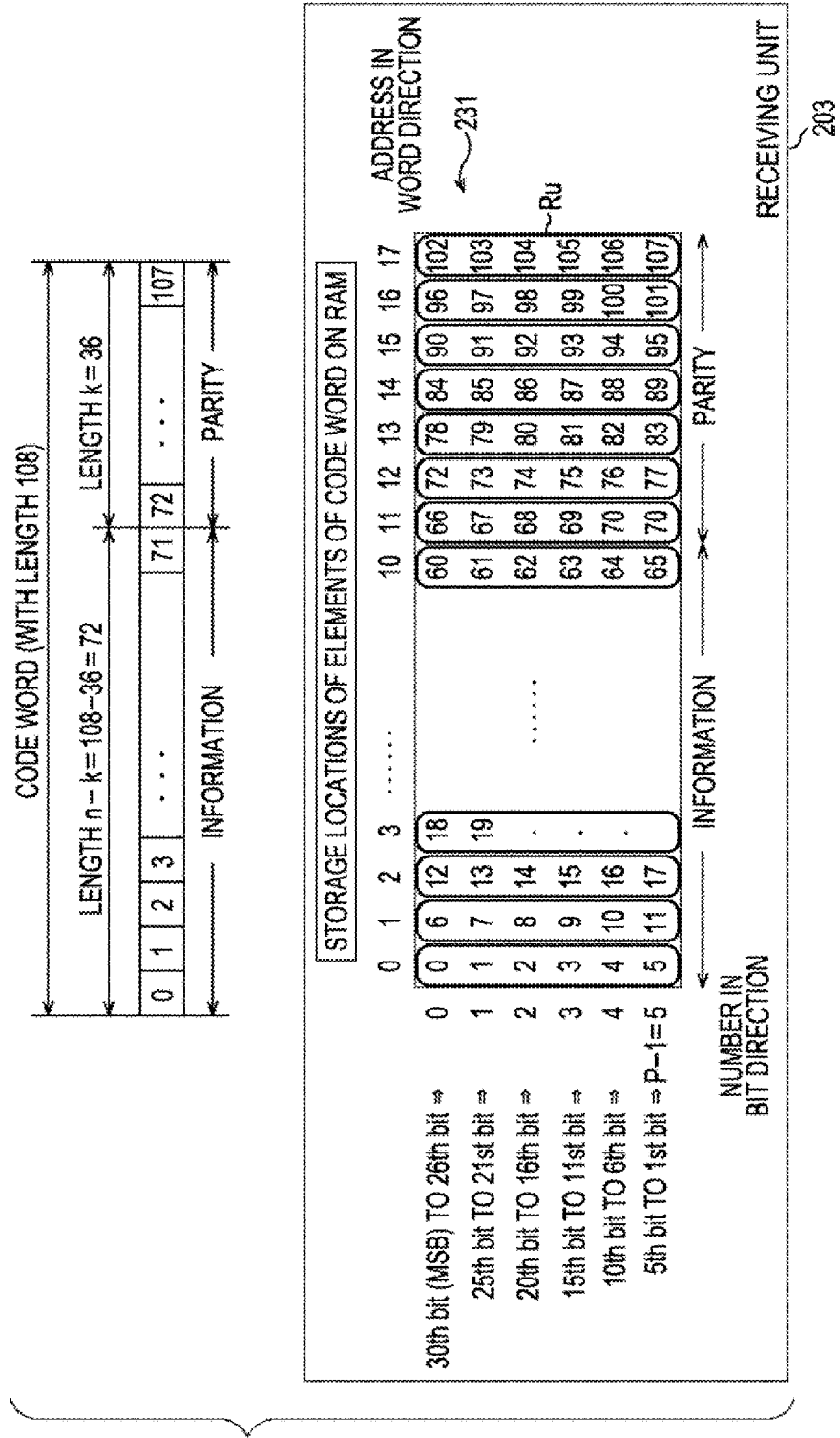
FIG. 18 is a diagram illustrating an example of a manner in which data elements of an LDPC codeword with a code length of 108 and a coding rate $r=2/3$ are numbered.

According to an embodiment of the present invention, there is provided a decoding apparatus (for example, an LDPC decoding apparatus shown in FIG. 20) adapted to decode data in units of codewords (for example, a codeword shown on the top of FIG. 18) each including a parity part, including storage means (for example, a received value memory 331 shown in FIG. 21 or 22 or a received value memory 351 shown in FIG. 23) having a storage capacity capable of storing at least data with a length equal to the length of one codeword, and receiving means (for example, a receiving unit 302 shown in FIG. 20) for receiving, as a received value, each element of a codeword in a bit-interleaved form, performing bit deinterleaving and parity permutating on the received values (for example, according to a method described in FIG. 22 or 23), and storing the resultant received values in the storage means.

The present invention is described in further detail below with reference to embodiments in conjunction with the accompanying drawings.

Figure 20:
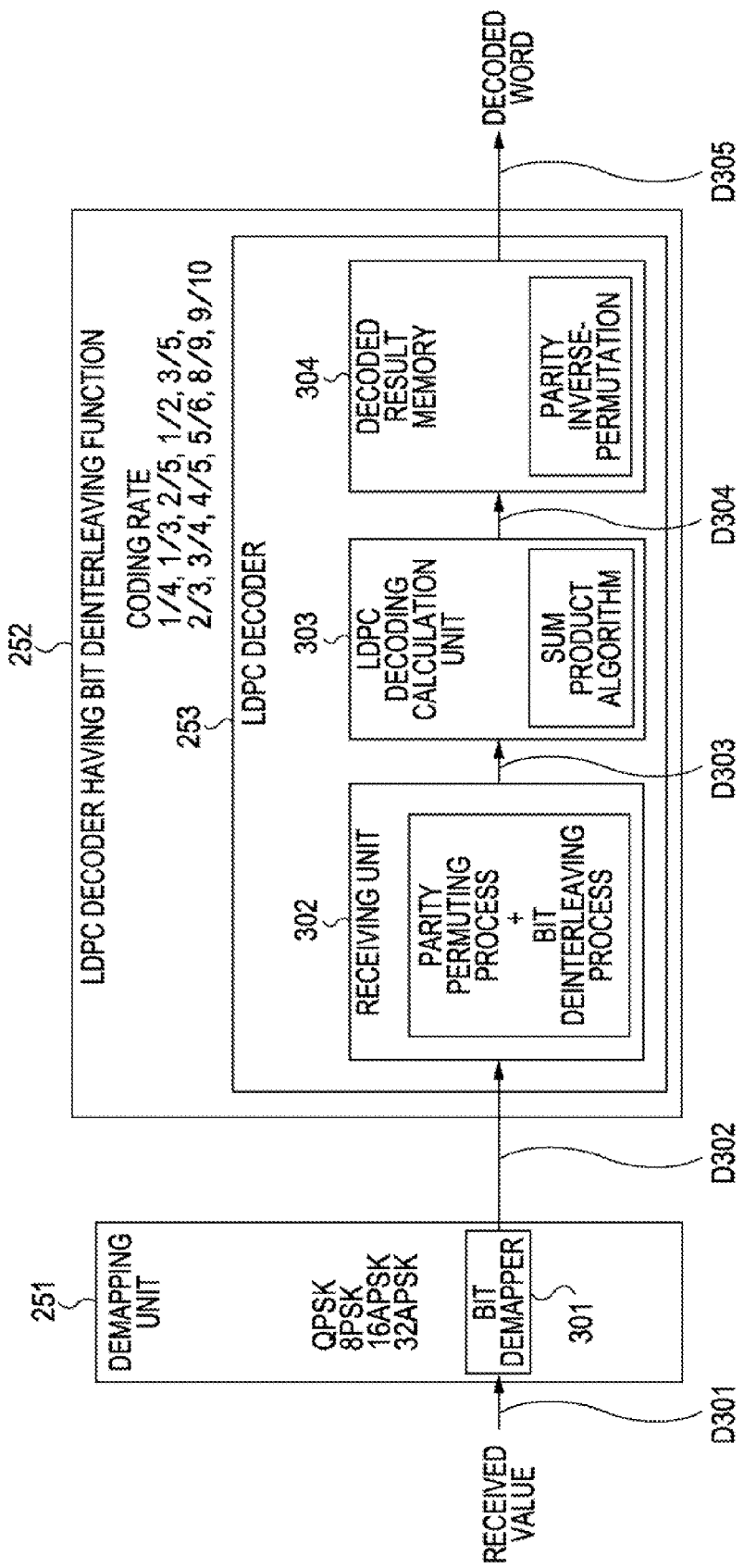
FIG. 20 is a block diagram illustrating an example of a functional configuration of an LDPC decoding apparatus having bit deinterleaving function according to an embodiment of the present invention.

FIG. 20 illustrates an example of a functional configuration of an LDPC decoding apparatus according to an embodiment of the present invention. In FIG. 20, to provide an easy comparison with the LDPC decoding apparatus shown in FIG. 6, only a demapping unit 251 and an LDPC decoder having bit deinterleaving function 252 are shown, although the LDPC decoding apparatus may include other components.

Figure 6:
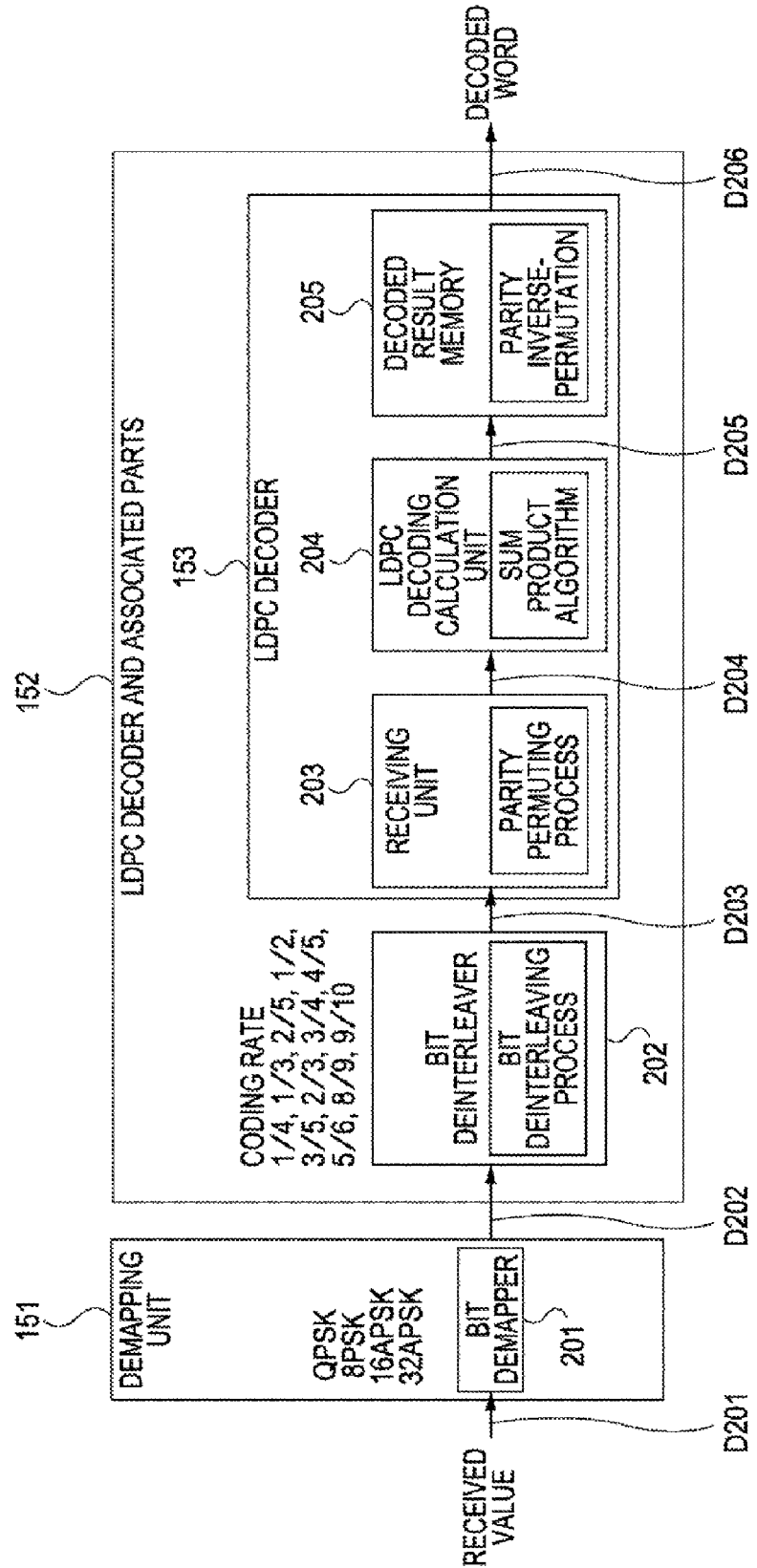
FIG. 6 is a diagram illustrating an example of a functional configuration of an LDPC decoding apparatus in a receiver adapted to receive a signal according to the DVB-S.2 standard.

As can be easily seen from the comparison from FIG. 20 and FIG. 6, the LDPC decoding apparatus according to the present embodiment of the present invention shown in FIG. 20 does not have the bit deinterleaver 202 disposed at a stage in front of the LDPC decoder 153 in the LDPC decoding apparatus shown in FIG. 6. In the LDPC decoding apparatus according to the present embodiment of the present invention shown in FIG. 20, when a received value D302 is stored in a storage unit (hereinafter, also referred to as a received value memory) in a receiving unit 302 of the LDPC decoder 253, a bit deinterleaving process is performed as well as a parity permutation process.

Figure 10:
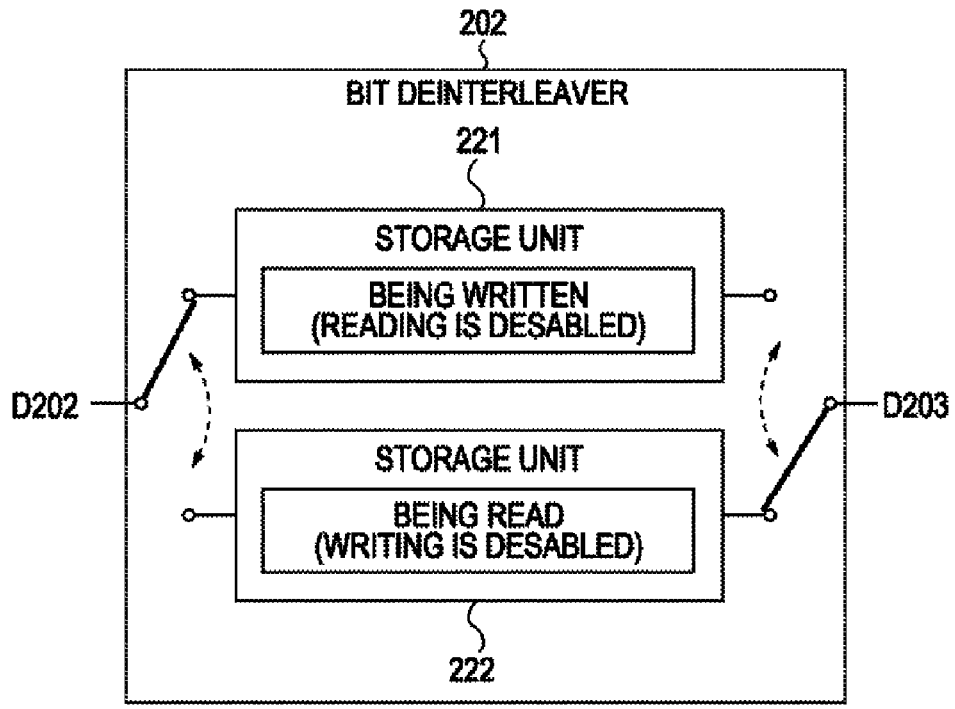
FIG. 10 is a diagram illustrating an example of an implementation of a bit deinterleaver.
Figure 11:
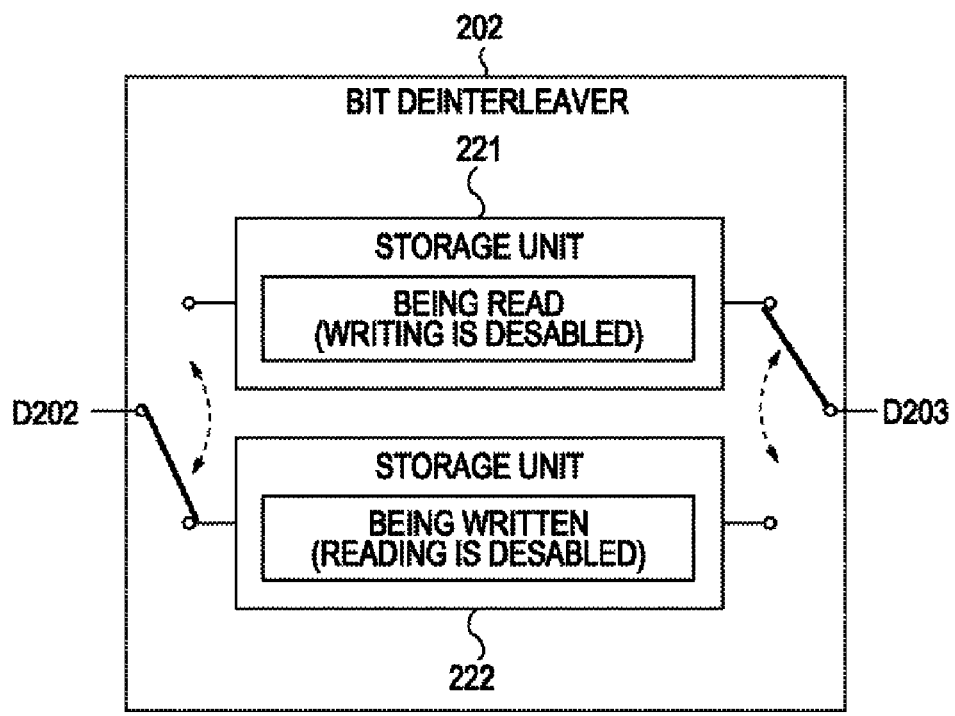
FIG. 11 is a diagram illustrating an example of an implementation of a bit deinterleaver.
Figure 12:
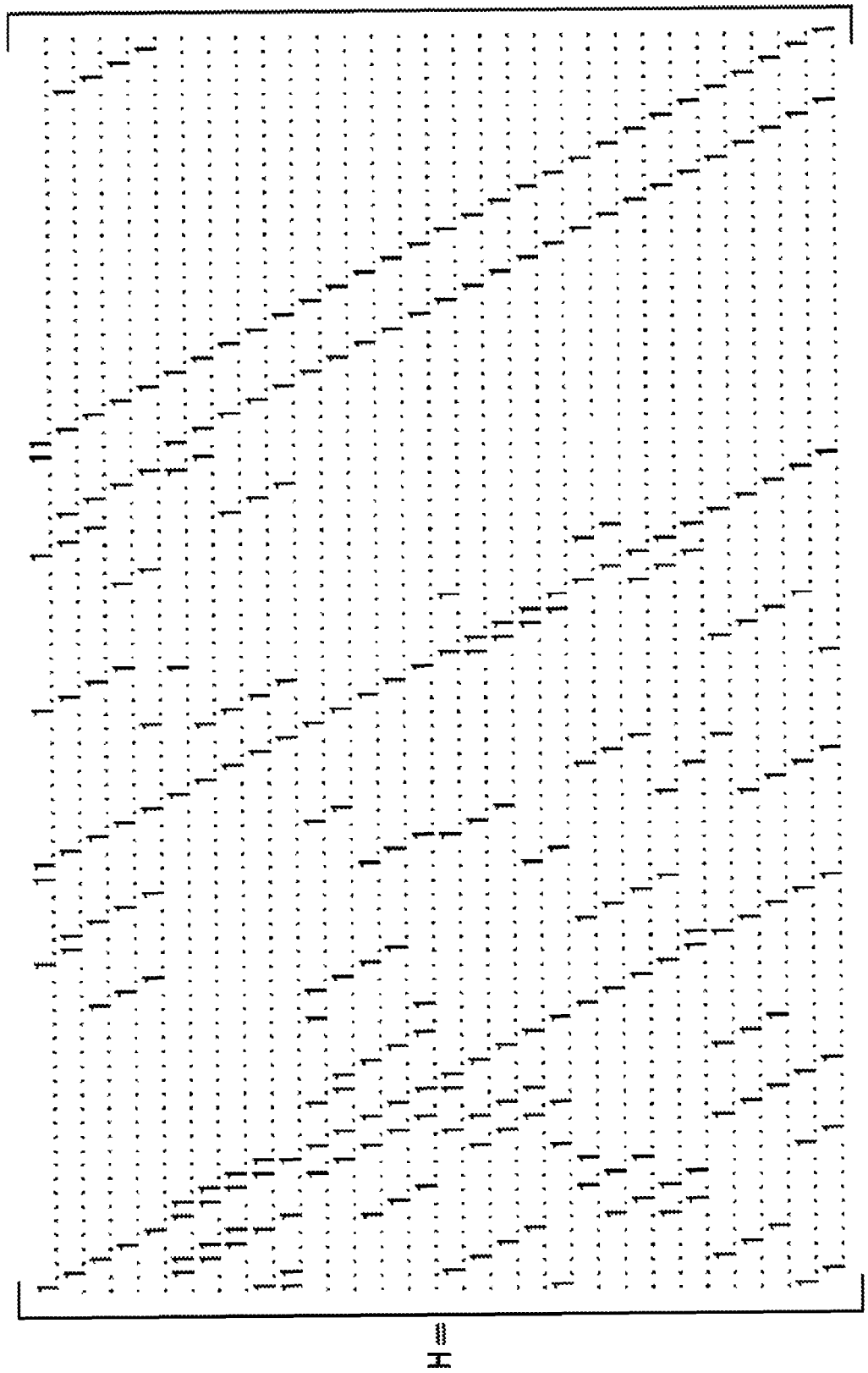
FIG. 12 is a diagram illustrating an example of a parity check matrix for an LDPC code.
Figure 13:
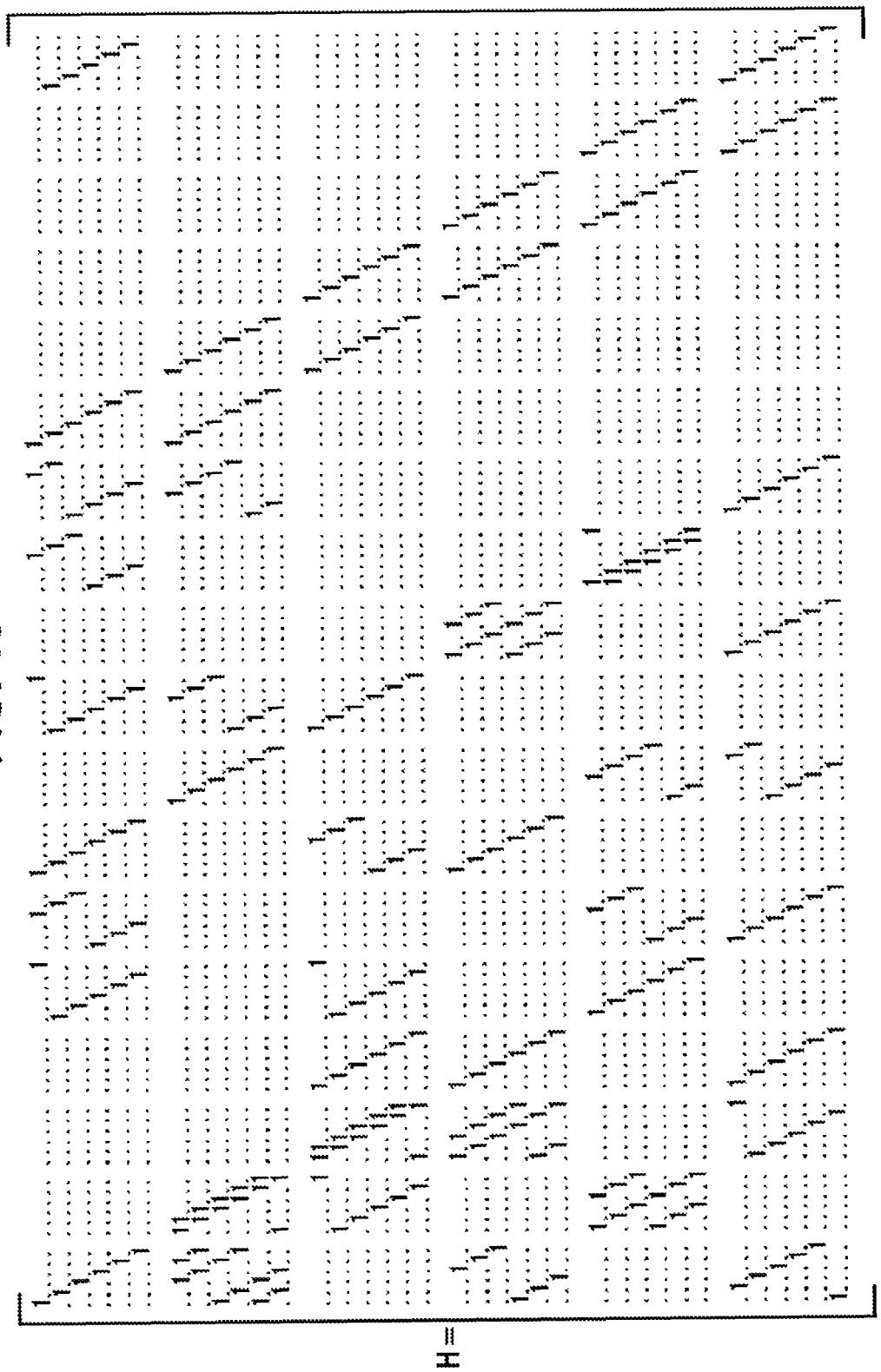
FIG. 13 is a diagram illustrating an example of a parity check matrix for an LDPC code.
Figure 14:
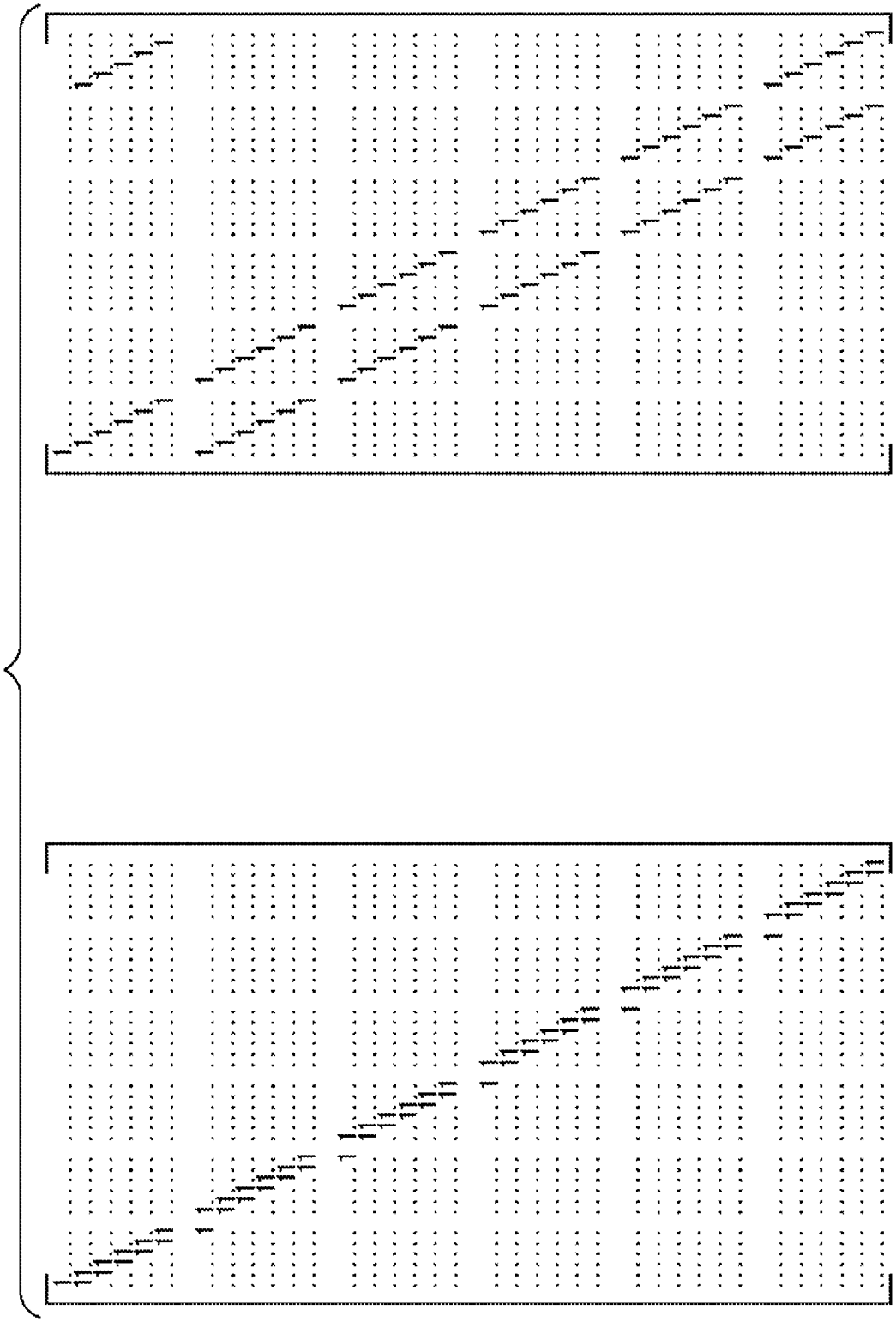
FIG. 14 illustrates an example of a parity part in a state not yet subjected to a row/column permutation and a parity part in a state subjected to a row/column permutation.
Figure 15:
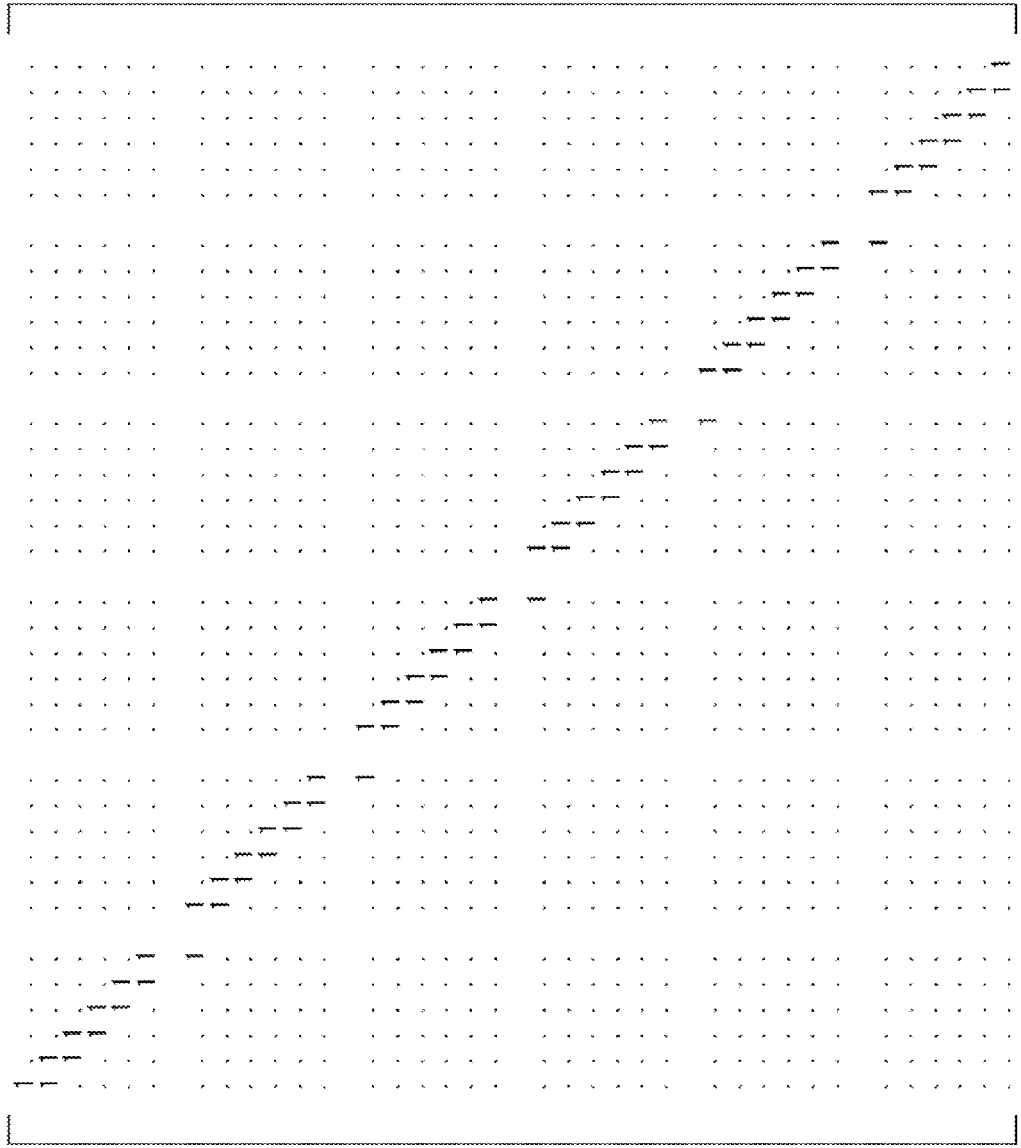
FIG. 15 illustrates an example of a parity part in a state not yet subjected to a row/column permutation.
Figure 16:
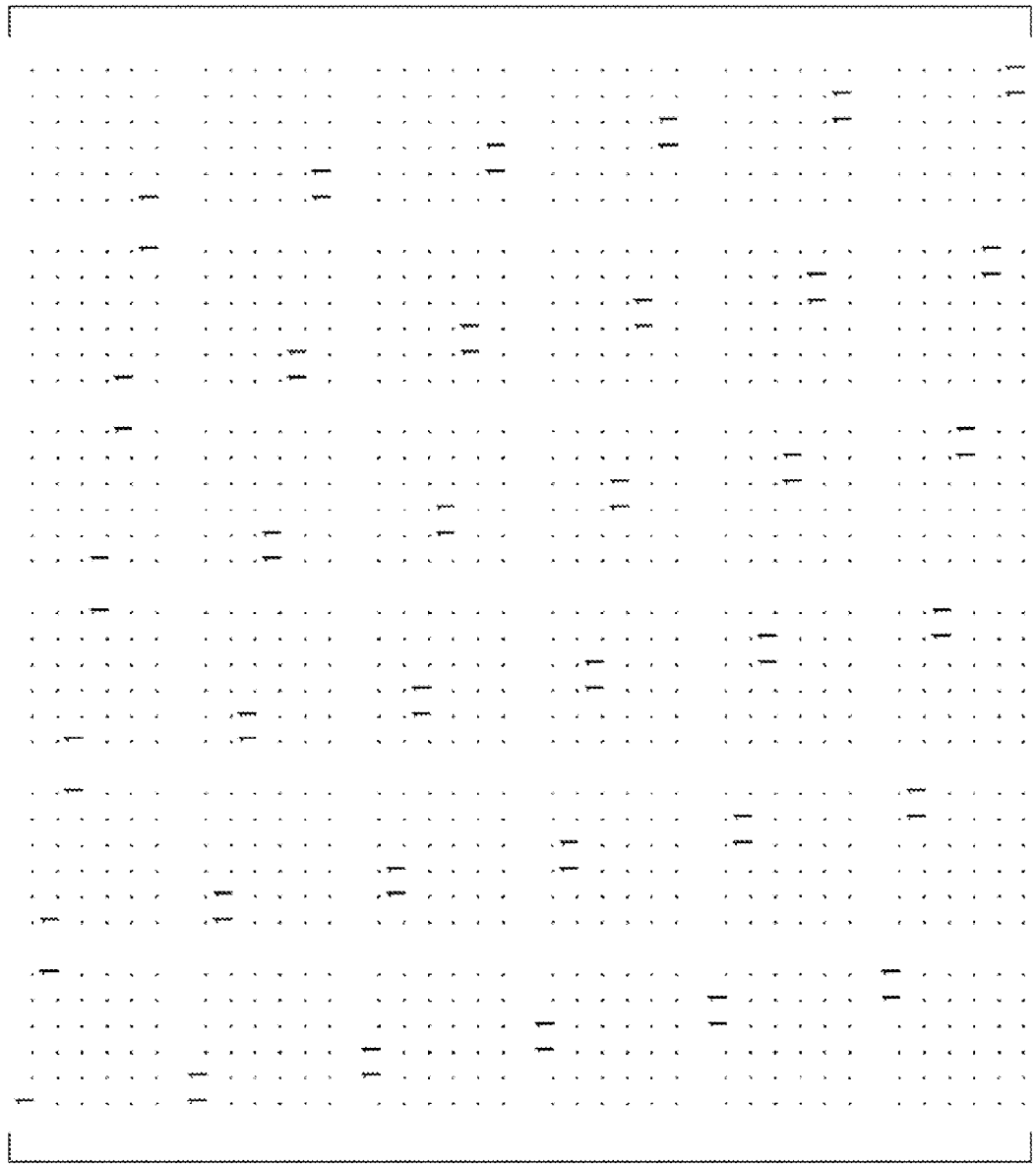
FIG. 16 illustrates an example of a parity part in a state subjected to a row permutation but not yet subjected to a column permutation.
Figure 17:
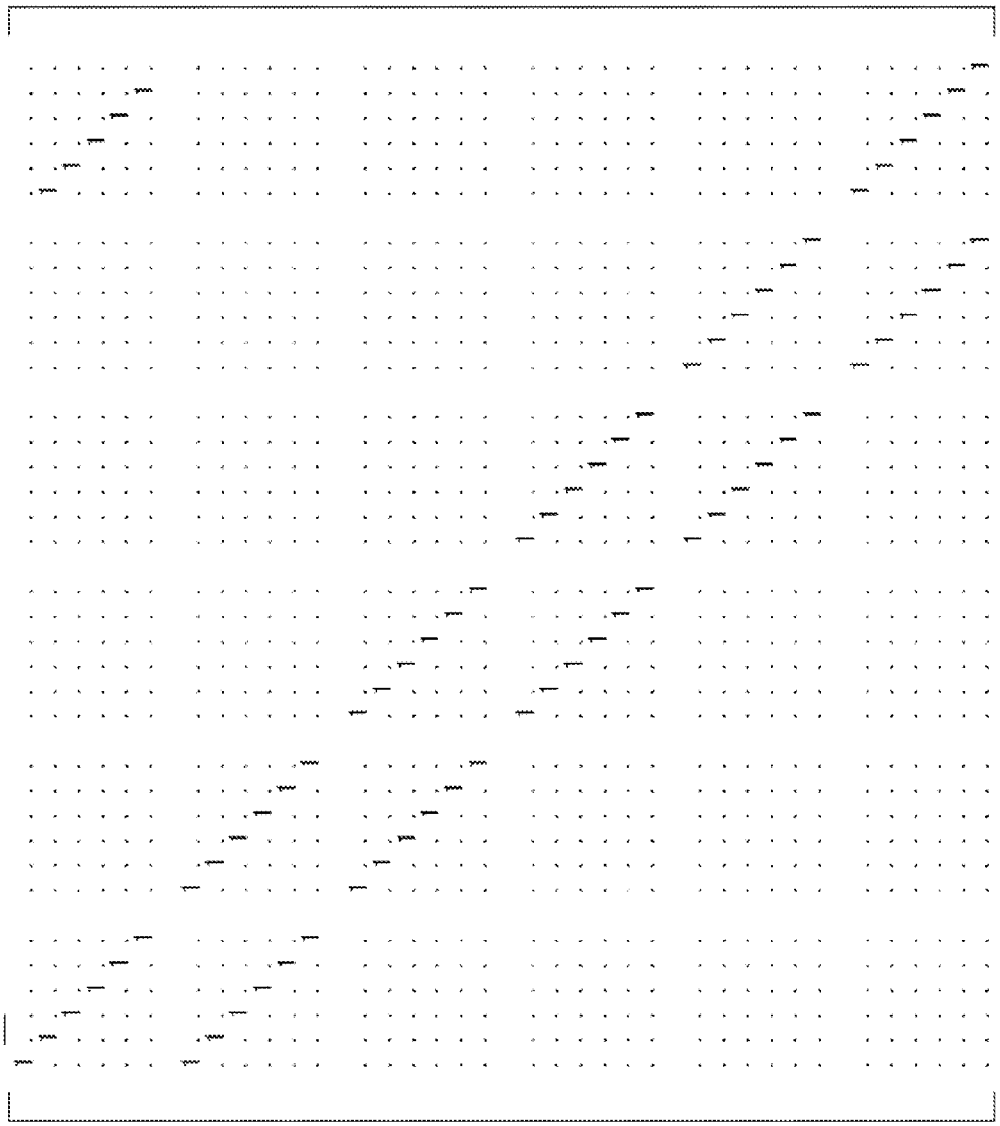
FIG. 17 illustrates an example of a parity part in a state subjected to row and column permutations.

In the configuration described above, two received value memories (for example, the storage devices 221 and 222 shown in FIG. 10 or 11) disposed in the bit deinterleaver 202 are no longer necessary, and thus it is possible to achieve a reduction in the circuit complexity of the LDPC decoding apparatus.

Hereinafter, the LDPC decoding apparatus configured as shown in FIG. 20 according to the present embodiment of the invention will be referred to as an LDPC decoding apparatus having bit deinterleaving function.

The demapping unit 251 in the LDPC decoding apparatus having bit deinterleaving function is configured in a similar manner and has similar functions to the demapping unit 151 shown in FIG. 6. That is, for the same data output from the transmitter, the output D302 from the demapping unit 251 is similar to the output D202 from the demapping unit 151 shown in FIG. 6.

The output D302 from the demapping unit 251 is serially input, in units of received values, to the LDPC decoder having bit deinterleaving function 252.

As described above, the LDPC decoder having bit deinterleaving function 252 does not have the bit deinterleaver 202 (FIG. 6) but has an LDPC decoder 253 instead of the LDPC decoder 153. The LDPC decoder 253 includes a receiving unit 302, an LDPC decoding calculation unit 303, and a decoded result memory 304.

The receiving unit 302 is supplied with an output D302 from the demapping unit 251. The receiving unit 302 simultaneously performs the bit deinterleaving process and the parity permutation process on the output D302 supplied from the demapping unit 251. These processes performed by the receiving unit 302 will be described in detail later with reference to FIGS. 21 to 24.

Because the data is subjected to the bit deinterleaving process and the parity permutation process in the receiving unit 302, data D303 output as a result from the receiving unit 302 is similar to the output D204 from the receiving unit 203, for the same data transmitted from the transmitter.

The LDPC decoding calculation unit 303 and the decoded result memory 304 are basically similar in configuration and function to the LDPC decoding calculation unit 204 and the decoded result memory 205 shown in FIG. 6. That is, the LDPC decoding calculation unit 204 and the decoded result memory 205 shown in FIG. 6 can be directly used as the LDPC decoding calculation unit 303 and the decoded result memory 304.

However, note that a received word taken as an example in the present embodiment is different from the example of the received word described above. That is, in the previous explanation, for convenience, the received word was assumed to be 8PSK data with a code length of 108, coding rate r=2/3, and P=6 (see, FIG. 18). On the other hand, in the present embodiment, it is assumed that the received word is 8PSK data with a code length of 64800, coding rate r=2/3, and P=360.

In the LDPC decoding process using a parity check matrix according to the DVB-S.2 standard, the LDPC decoding calculation is performed in parallel for 360 (=P) received values. The LDPC decoding calculation unit 303 (FIG. 20) according to the present embodiment is configured to perform the LDPC decoding calculation in such a manner. That is, in the present embodiment, to reduce the calculation time, 360 received values are read in parallel at a time from the receiving unit 302 into the LDPC decoding calculation unit 303, and 360 parallel LDPC decoding calculation units in the LDPC decoding calculation unit 303 perform the LDPC decoding calculation process in parallel.

In other words, the LDPC decoding apparatus having bit deinterleaving function according to the present embodiment of the invention is different from the LDPC decoding apparatus shown in FIG. 6 in that the receiving unit 302 is configured to perform both the bit deinterleaving process and the parity permutation process.

Thus, the simultaneous execution of the bit deinterleaving process and the parity permutation process by the receiving unit 302 is described in detail below with reference to FIGS. 21 to 24.

Figure 21:
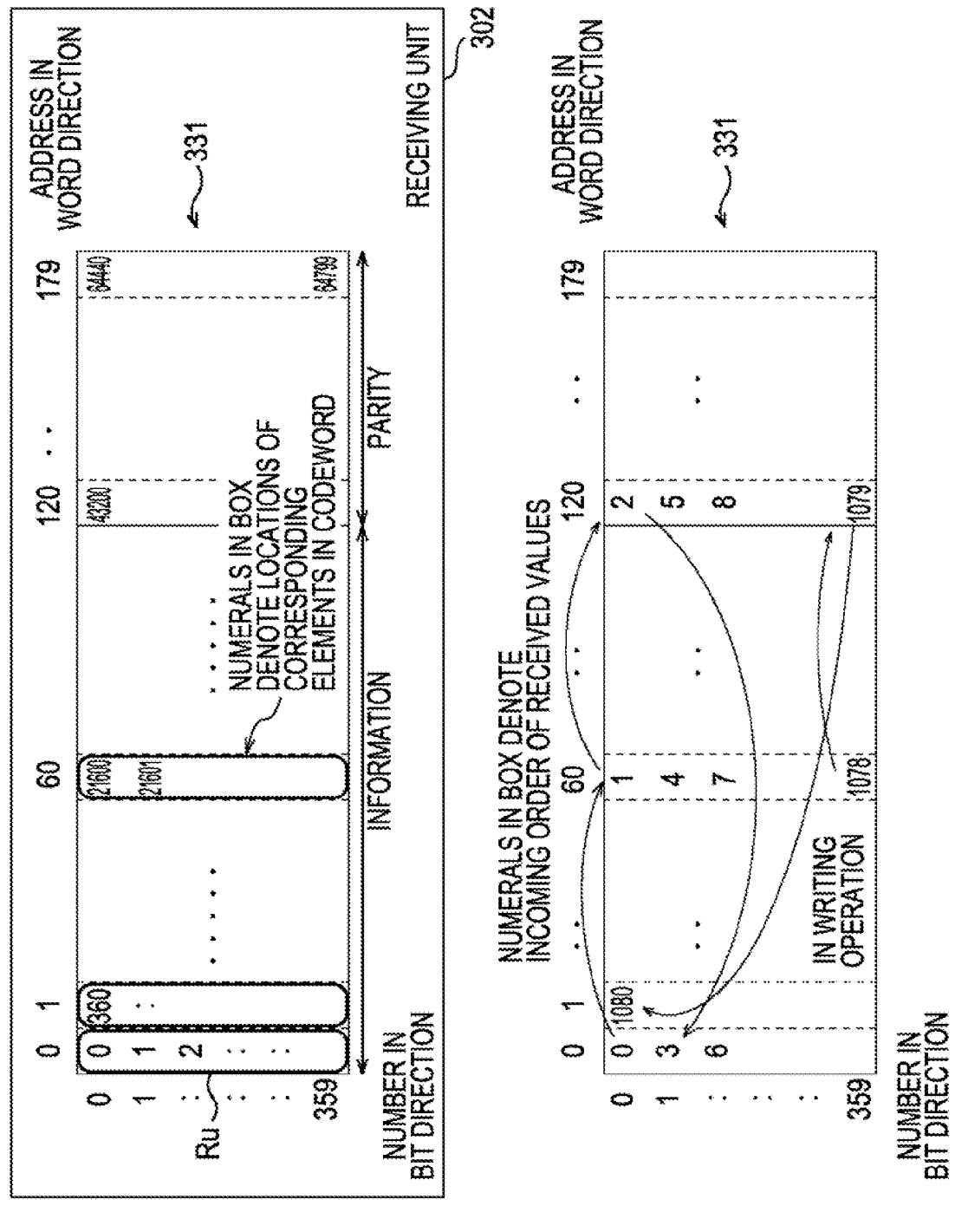
FIG. 21 is a diagram illustrating an example of a configuration of a received value memory in a receiving unit of an LDPC decoding apparatus having bit deinterleaving function and a bit deinterleaving process performed on received values.

On the top of FIG. 21, illustrated is an example of a configuration of a received value memory 331 disposed in the receiving unit 302 according to the present embodiment of the invention. This specific example of the configuration is usable when each received word input to the receiving unit 302 is 8PSK data with a code length of 64800 and coding rate r=2/3 according to the DVB-S.2 standard. In this case, the parameters n, k, $n_0$, and $k_0$ used in the LDPC decoding process on the received word in the form of 8PSK data with the code length of 64800 and the coding rate r=2/3 according to the DVB-S.2 standard are determined such that n=64800, k=43200, $n_0$=180, and $k_0$=120.

In the present embodiment, received words are serially input in units of received values to the receiving unit 302. To write received values, which are serially input to the receiving unit 302, at correct locations in the received value memory 331, the received value memory 331 in the receiving unit 302 is realized using a partially writable RAM capable of storing data at any specified location.

Furthermore, in order for the 360 parallel LDPC decoding calculation unit in the LDPC decoding calculation unit 303 to perform the LDPC decoding calculation in parallel, the received value memory 331 in the receiving unit 302 is configured as follows. That is, the number of words and the bit width are determined so that as many as 360 soft received values are written in each word (in each column) and one word is read out at a time. More specifically, for example, in a case where each soft received value is quantized by 5 bits, the received value memory 331 is configured so as to have a size of 5×360=1800 bits in a bit width direction and a size of 64800/360=180 words in a word direction.

In the following explanation, data elements of each codeword (output codeword) read out from the receiving unit 302 are serially numbered starting from the first data element. More specifically, the first data element is numbered as 0, and the number is incremented by one for the following data elements.

In the received value memory 331, the elements of the output codeword are written at storage locations denoted by numerals in a box shown on the top of FIG. 21 illustrating the structure of the received value memory 331. That is, the data elements of the output codeword are sequentially written in the received value memory 331 in ascending order of the bit-direction number. More specifically, a (P×x+y)th data element of the output codeword is written in the received value memory 331 at a location (x, y) where x is the bit-direction number and y is the word-direction address.

Figure 7:
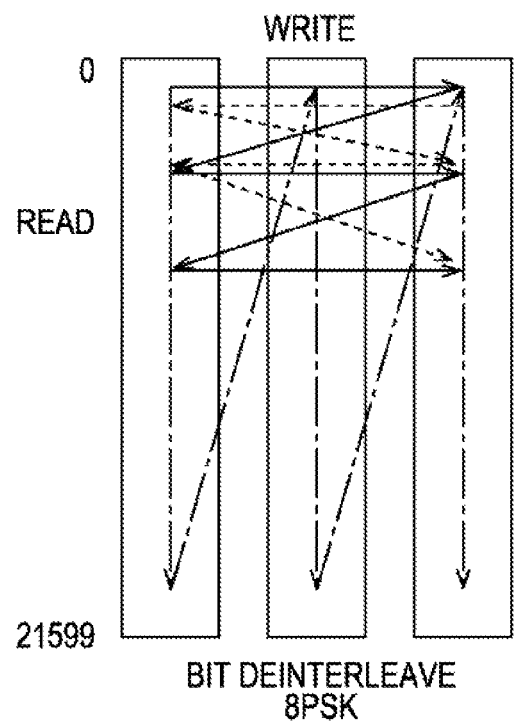
FIG. 7 is a diagram illustrating a bit deinterleaving scheme for an 8PSK signal.
Figure 8:
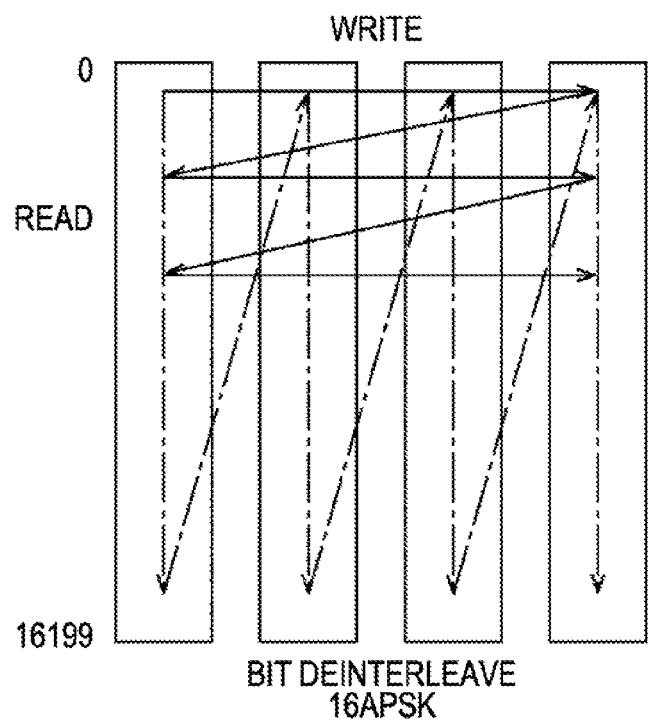
FIG. 8 is a diagram illustrating a bit deinterleaving scheme for an 16APSK signal.
Figure 9:
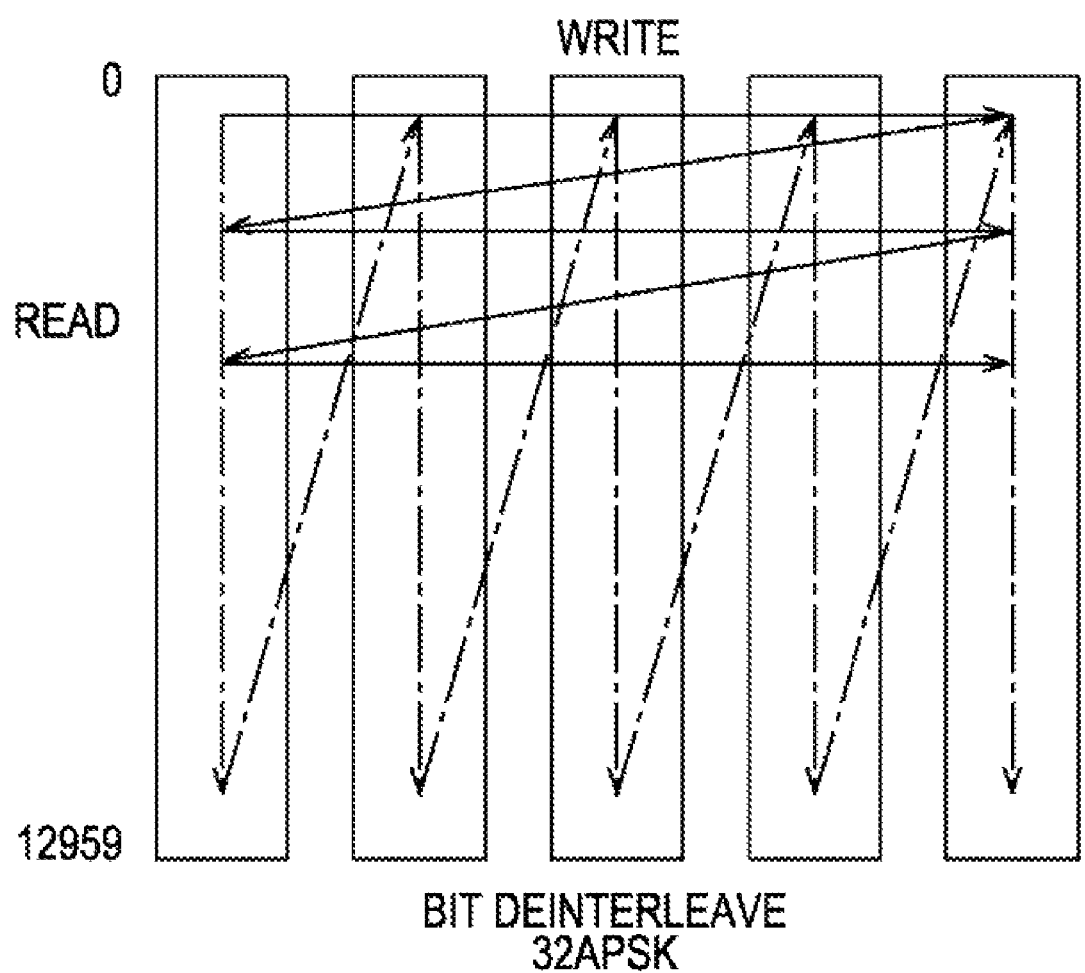
FIG. 9 is a diagram illustrating a bit deinterleaving scheme for an 32APSK signal.

In the present example, 8PSK-modulated received words with coding rate r=2/3 are serially input into to the receiving unit 302 and bit-deinterleaved by the receiving unit 302 according to the scheme described above with reference to FIG. 7.

Therefore, if received values are placed (written) on the received value memory 331 such that received values received at immediately adjacent times are spaced by a distance corresponding to the number of received values equal to 64800/3=21600, bit deinterleaving is correctly achieved.

That is, in the received value memory 331, as many as 360 received values are written in each word (in one column) as described above. Therefore, each two received values received at immediately adjacent times are written in different columns located apart from each other by the number of words equal to 21600/360=60 as represented by arrows on the bottom of FIG. 21.

In the diagram on the bottom of FIG. 21 illustrating the structure of the received value memory 331, numerals in a box indicates the incoming order of the received values serially input to the receiving unit 302. Because the received values are written in the same order as the order in which received values arrives, the numerals in the box also indicates the order in which the received values are written.

Figure 19:
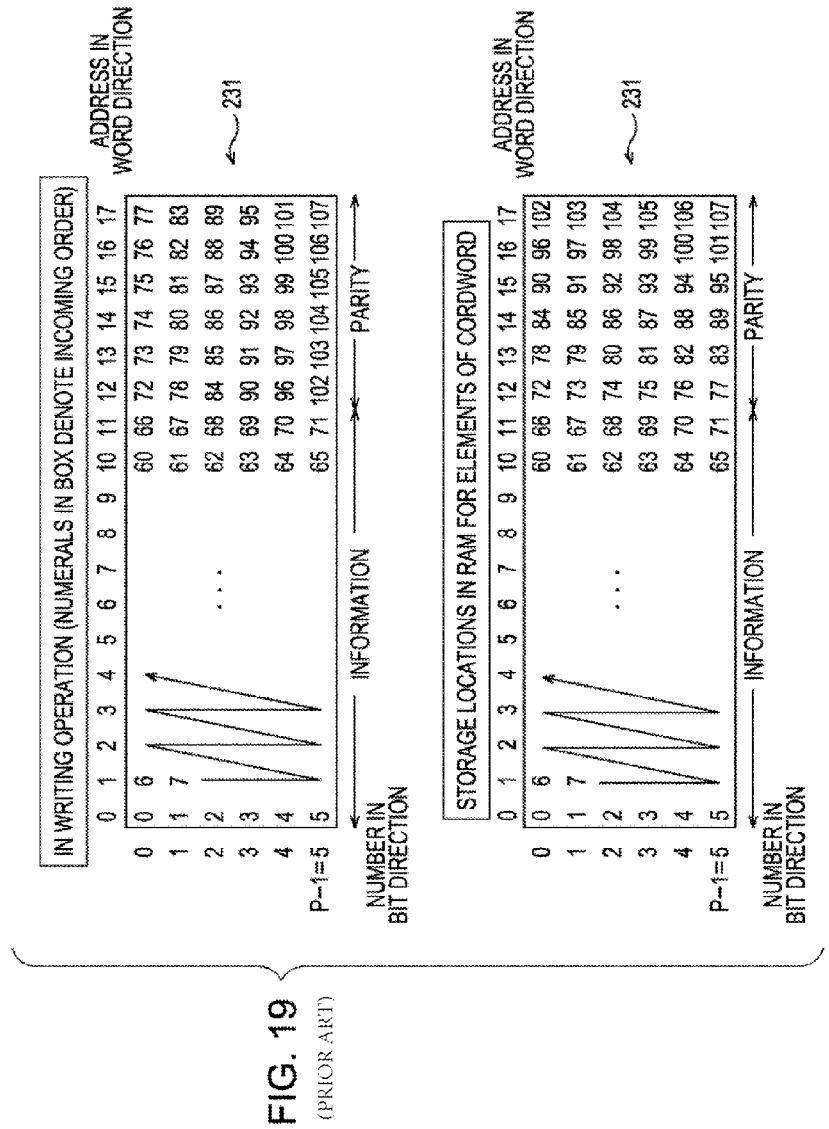
FIG. 19 is a diagram provided for an explanation of parity permutation.

To correctly perform the bit deinterleaving, as can be seen from the diagram shown on the bottom of FIG. 21, the receiving unit 302 writes the received values in a horizontal direction (word direction) at intervals of 60 words (=$n_0$/3). That is, as described above with reference to the diagram shown on the top of FIG. 19, a (j×360+i)th data element of the output codeword is located at a bit-direction number equal to i and a word-direction address equal to j. Therefore, each two received values received at immediately adjacent times are written at locations apart from each other by a distance corresponding to 64800/3=21600 elements, and thus the bit deinterleaving is automatically achieved.

Furthermore, in the present embodiment, the receiving unit 302 simultaneously performs the bit deinterleaving and the parity permutation process as follows.

The receiving unit 302 determines whether each received value is of the parity part, on the basis of the incoming order of the received values. For received values determined to be of the parity part, that is, for received values of the incoming order corresponding to the parity part, the receiving unit 302 also performs the parity permutation thereby achieving both the bit deinterleaving and the parity permutation.

In other words, as described above, the received values corresponding to the information part are not subjected to the permutation after the bit deinterleaving process. That is, for received values determined to be of the information part, that is, for received values of the incoming order corresponding to the information part, the receiving unit 302 performs only the bit deinterleaving by writing the received values in the received value memory 331 in accordance with the scheme described above with reference to FIG. 21.

More specifically, in the present example, 8PSK-modulated received words with coding rate r=2/3 are input into to the receiving unit 302. Therefore, if the received values are serially numbered in the incoming order starting with 0, any received value belonging to the parity part has a serial number which has a remainder of 2 when divided by 3, while received values having any other serial number belong to the information part.

Therefore, the receiving unit 302 can simultaneously perform the bit deinterleaving and the parity permutation by sequentially writing the received values into the received value memory 331 according to a scheme described below with reference to FIG. 22.

Figure 22:
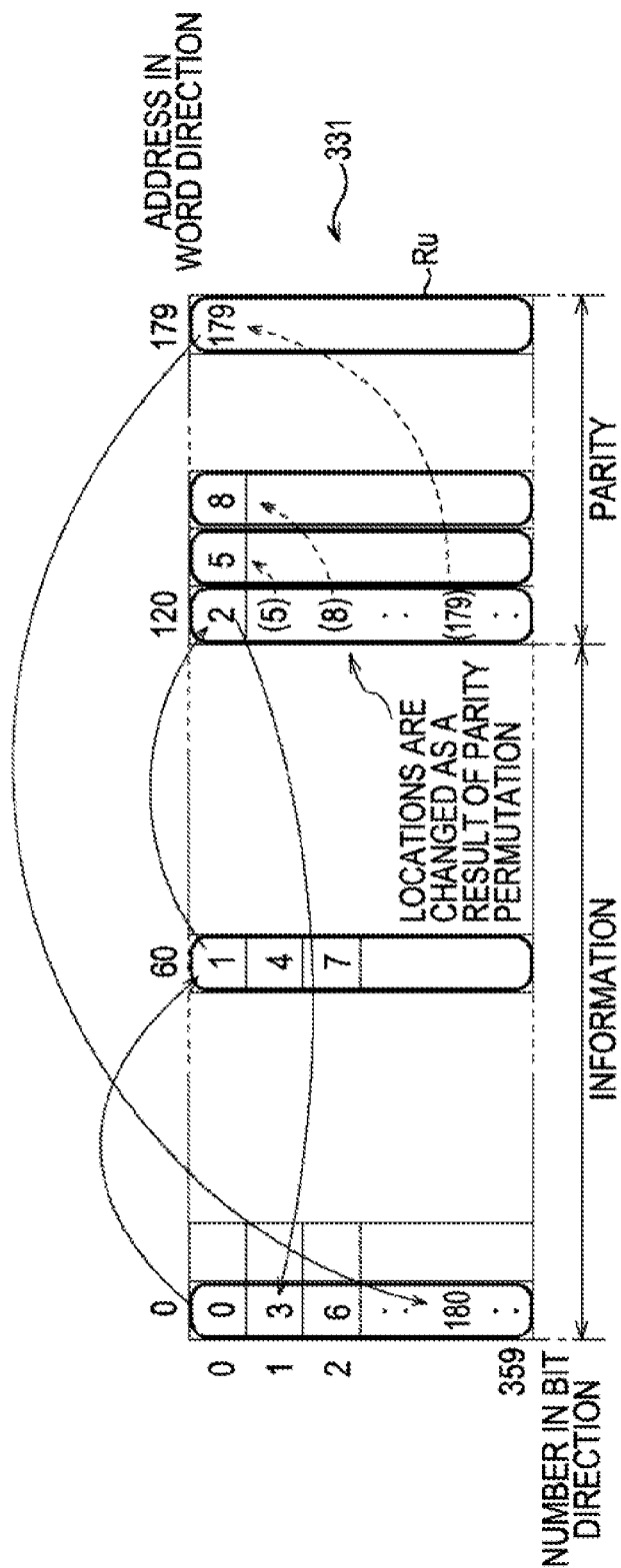
FIG. 22 is a diagram illustrating a received value writing method including a bit deinterleaving process and a parity permutation process performed simultaneously on received values.

In FIG. 22 illustrating the structure of the received value memory 331, numerals in a box represent the incoming order in which received words are serially input to the receiving unit 302. Because the received values are written in the same order as the order in which received values arrives, the numerals in the box also indicates the order in which the received values are written.

When the receiving unit 302 is supplied with received values having a serial number indicating the arrival order which leads to no remainder or a remainder of 1 when divided by 3, the receiving unit 302 writes those received values in a horizontal direction (word direction) at intervals of 60 words ($=n_0/3$) in the information part of the received value memory 331 in the order represented by solid arrows shown in FIG. 22. When the data is read out as data elements of the output codeword from the received value memory 331, the reading is performed in parallel in a vertical direction on a word-by-word basis (that is, one data element is read from each column Ru (see FIG. 22) at a time). Therefore, received values received at adjacent times are read at an interval corresponding to 64800/3=21600 pieces of received values. Thus, the bit deinterleaving for the information part of the received word is achieved.

On the other hand, when the serial number indicating the arrival order of a received value input to the receiving unit 302 has a value which leads to a remainder of 2 when divided by 3, any such received value belongs to the parity part.

Such received values belonging to the parity part are once written, as with the received values belonging to the information part, in the bit direction in a parity part storage area (an storage area for storing a parity part of an output codeword) of the received value memory 331 shown in FIG. 22 thereby to achieve the bit deinterleaving. For example, for a 5th received value, the bit deinterleaving is performed when this received value is located at a position denoted by (5).

The received values corresponding to the parity part are relocated to positions denoted by numerals not enclosed in parentheses in the parity part storage area of the received value memory 331. That is, by writing those received values in the word direction in the order as represented by dashed arrows in FIG. 22, the parity permutation is performed as described above with reference to FIG. 19. For example, for the 5th received value, the parity permutation is achieved by relocating it from the position denoted by (5) to a position denoted by 5.

Thus, when the received values corresponding to the parity part is written in the parity part storage area of the received value memory 331 shown in FIG. 22, if they are directly written at locations specified by numerals not enclosed in parentheses without locating them in the bit direction at positions denoted by numerals enclosed in parentheses, then the bit deinterleaving and the parity permutation are both achieved at the same time. For example, for the 5th received value, locating it at the position denoted by (5) is skipped, and it is directly written at the location denoted by 5 thereby achieving the bit deinterleaving and the parity permutation at the same time.

In the above explanation, it is assumed that data is 8PSK-modulated and has a coding rate $r=2/3$. However, the method described above is not limited to such data, but an arbitrary coding rate r is allowed. That is, for 8PSK-modulated received words with an arbitrary coding rate, it is possible to achieve the bit deinterleaving and the parity permutation at the same time by using a similar method, as described below.

Figure 1:
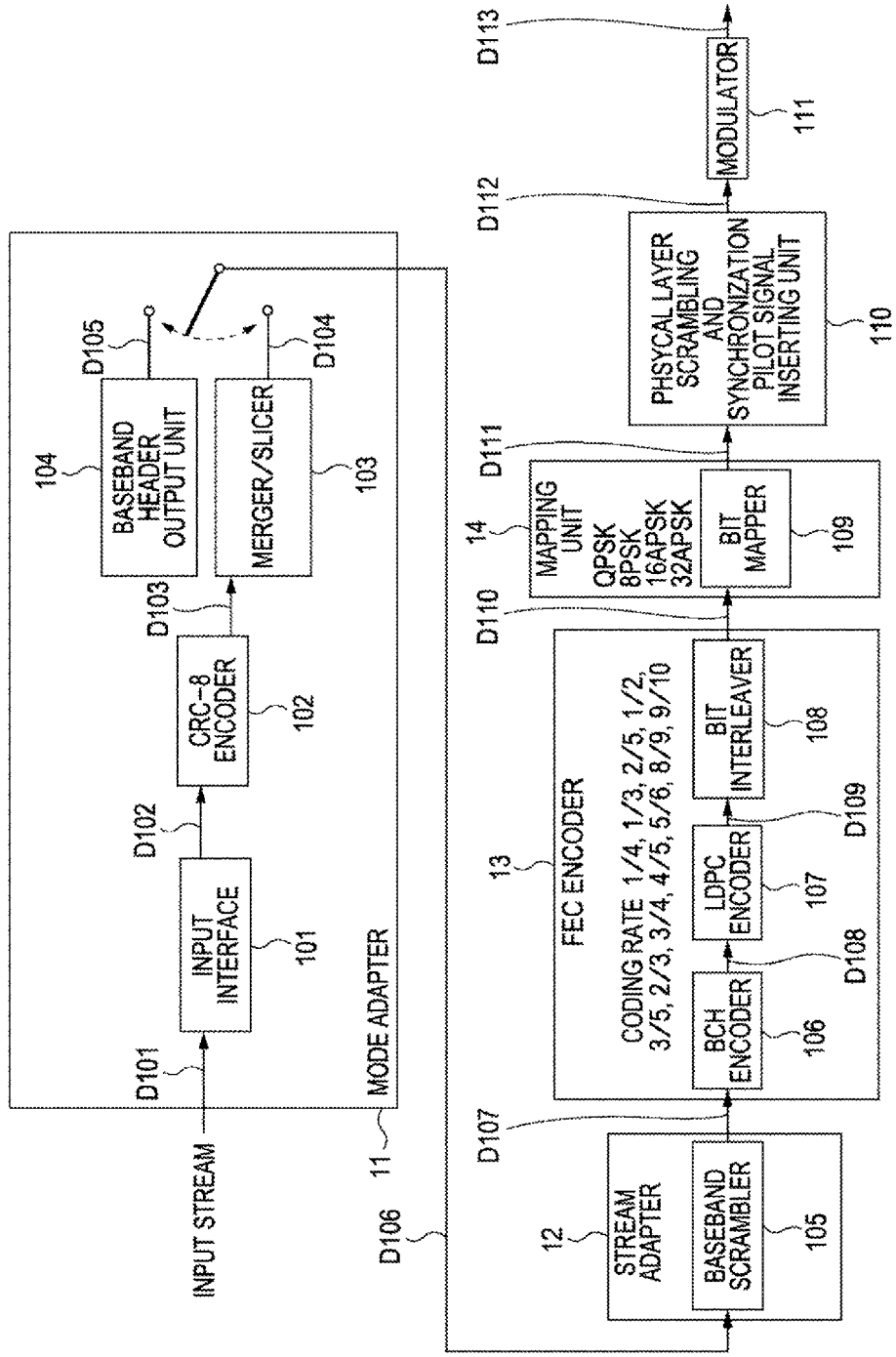
FIG. 1 is a block diagram illustrating an example of a configuration of a transmitter adapted to transmit a signal in accordance with a DVB-S.2 standard.
Figure 2:
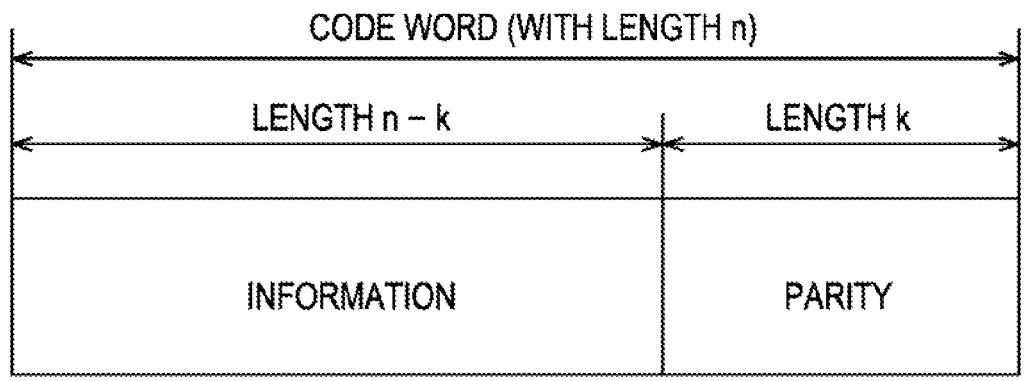
FIG. 2 is a diagram illustrating an example of a format of an LDPC codeword.
Figure 3:
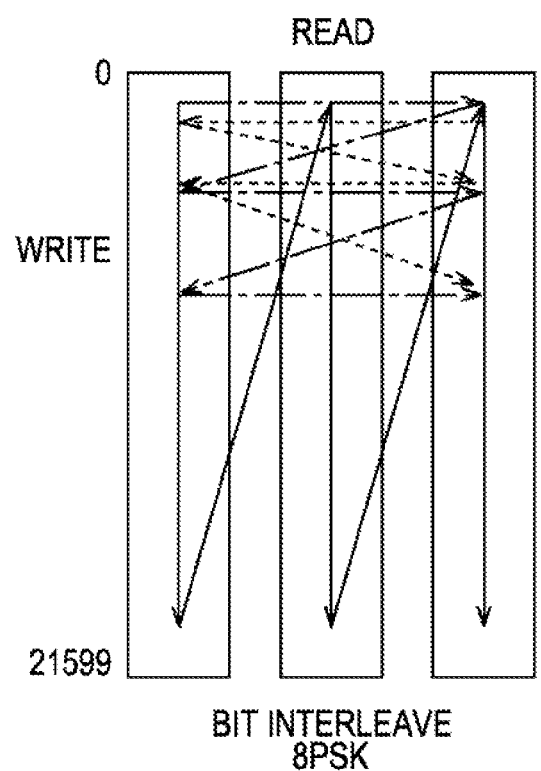
FIG. 3 is a diagram illustrating a bit interleaving scheme for a 8PSK-modulated signal.
Figure 4:
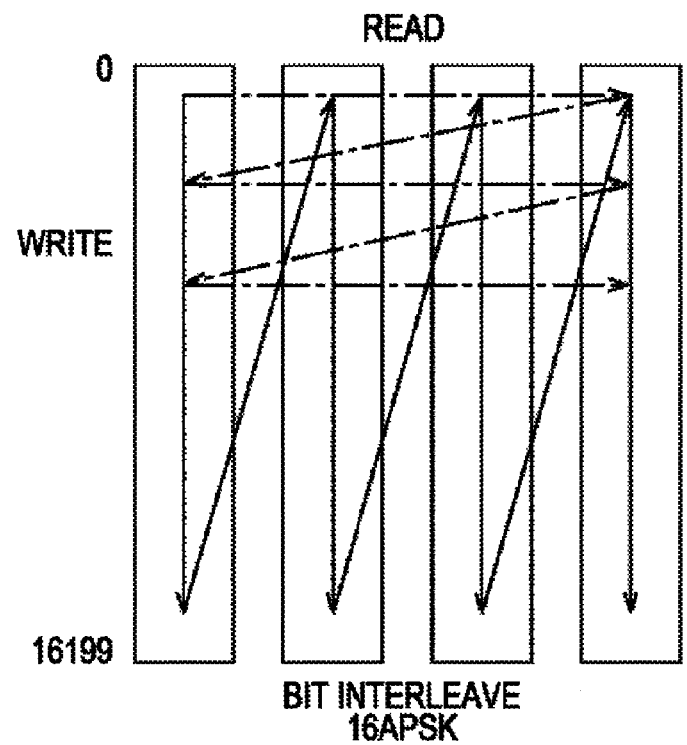
FIG. 4 is a diagram illustrating a bit interleaving scheme for a 16APSK-modulated signal.
Figure 5:
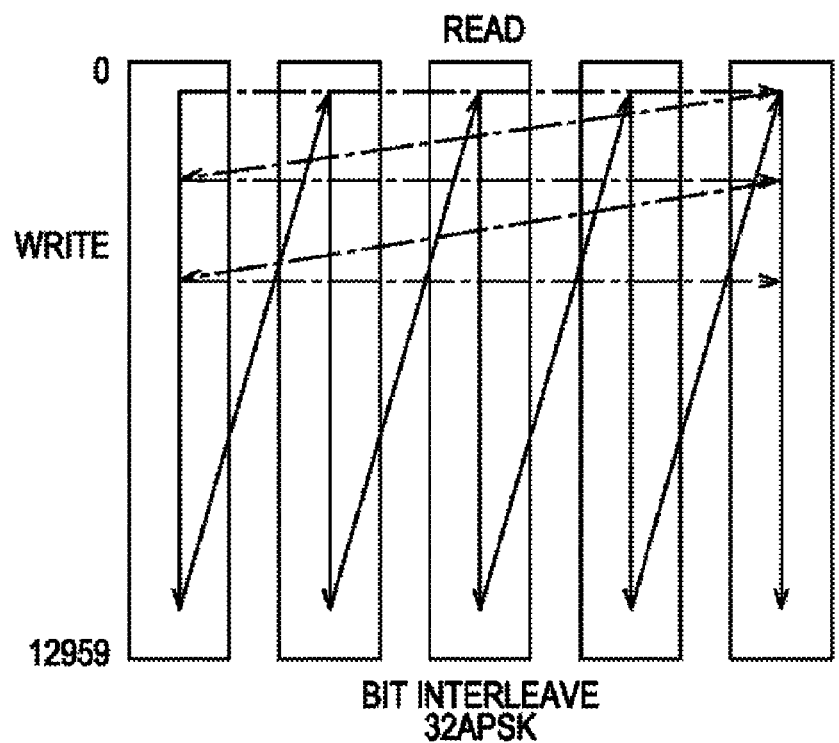
FIG. 5 is a diagram illustrating a bit interleaving scheme for a 32APSK-modulated signal.

In a case where an information word input to an LDPC encoder (for example, the LDPC encoder 107 of the transmitter shown in FIG. 1) is in the form of a sequence of 0s and 1s with a length $k=P \times k_0$, and a codeword output from the LDPC encoder is in the form of a sequence of 0s and 1s with a length $n=P \times n_0$, the coding rate r is defined by $k_0/n_0$.

In the following discussion, for ease of understanding, as with the example described above, it is assumed that n=64800, k=64800×r, P=360, $n_0$=180, $k_0$=180×r, and $2/3 \leq r$. Note that the method described below can also be used to simultaneously achieve the bit deinterleaving and the parity permutation for arbitrary values of $n_0$, $k_0$, and P.

Figure 23:
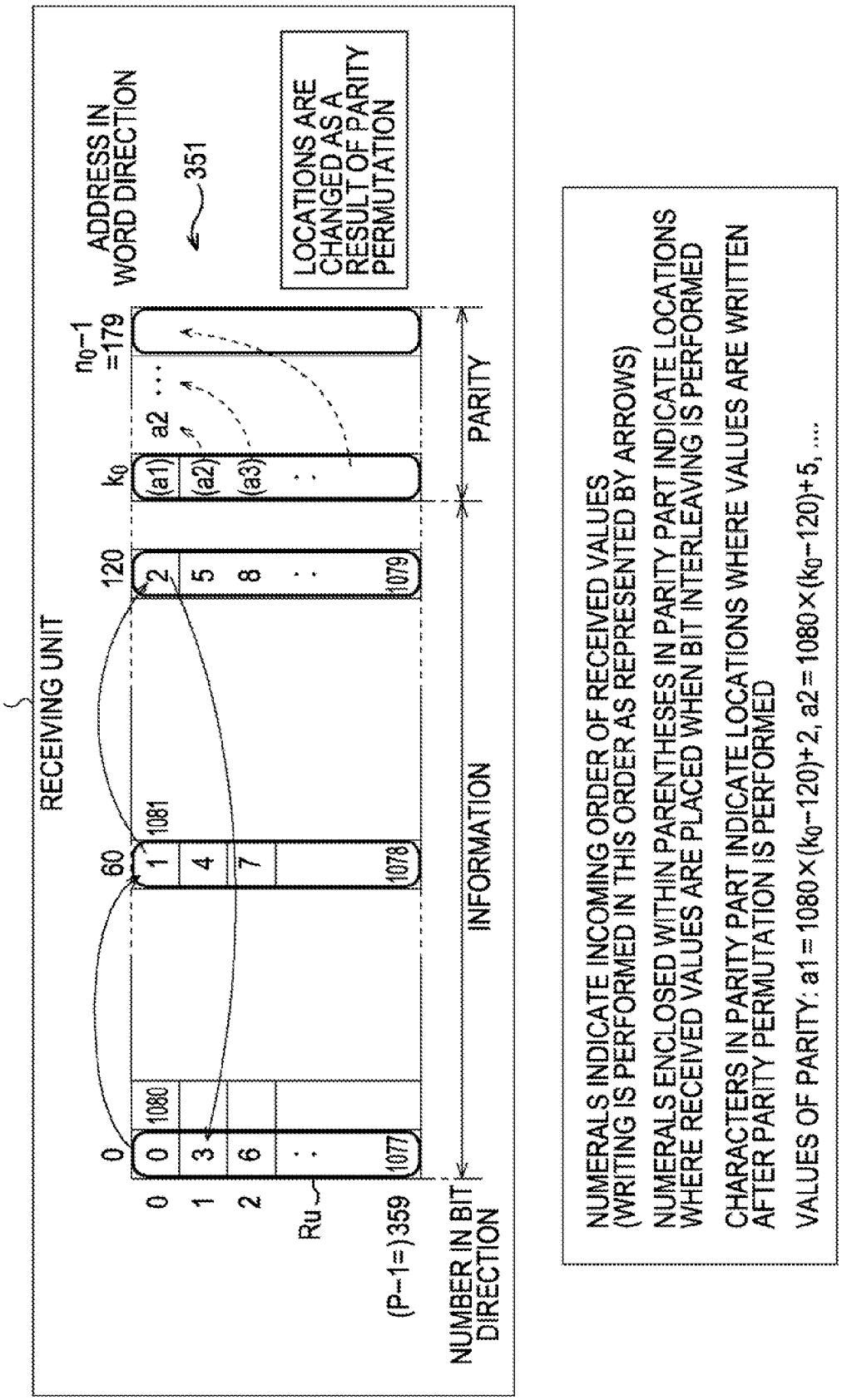
FIG. 23 is a diagram illustrating a received value writing method including a bit deinterleaving process and a parity permutation process performed simultaneously on received values.

FIG. 23 illustrates an example of a method. In this example, the bit deinterleaving and the parity permutation are achieved simultaneously for an 8PSK received word with a code length of 64800 and a coding rate r received by the receiving unit 302, by writing received values of the received word in an order denoted by arrows in FIG. 23.

The receiving unit 302 has a received value memory 351 configured as shown in FIG. 23. In FIG. 23 illustrating the structure of the received value memory 351, numerals in a box represent the incoming order in which received words are serially input to the receiving unit 302. Because the received values are written in the same order as the order in which received values arrives, the numerals in the box also indicates the order in which the received values are written.

As can be seen from FIG. 23, when a data element of the output codeword is at a word-direction address smaller than $k_0$, this data element belongs to the information part. However, when the word-direction address is equal to or greater than $k_0$, the data element belongs to the parity part.

In the present example, it is assumed that 8PSK is employed as the modulation scheme, and thus in the receiving unit 302, the bit deinterleaving is performed in the manner described above with reference to FIG. 7.

In this case, $r=k_0/n_0$, and thus $n_0 \times (2/3)=120 \leq k_0$. Therefore, if the received values are serially numbered in the incoming order starting with 0, when the receiving unit 302 is supplied with received values having a serial number which has no remainder or a remainder of 1 when divided by 3, the receiving unit 302 writes those received values in a horizontal direction (word direction) at intervals of 60 words ($=n_0/3$) in the information part of the received value memory 351 in the order represented by solid arrows shown in FIG. 23. When the data is read out as data elements of the output codeword from the received value memory 351, the reading is performed in parallel in a vertical direction on a word-by-word basis (that is, one data element is read from each column Ru (see FIG. 23) at a time). Therefore, received values received at adjacent times are read at an interval corresponding to 64800/3=21600 pieces of received values. Thus, the bit deinterleaving for the information part of the received word is achieved.

On the other hand, when the serial number indicating the arrival order of a received value input to the receiving unit 302 has a value which leads to a remainder of 2 when divided by 3, the received value is processed as follows.

When received values are written in the received value memory 351 in the horizontal direction (word direction) at intervals of $n_0/3=60$ words, as can be seen from FIG. 23, as many received values as 3 words (including 360×3=1080 received values) arrive during a period from a time at which a received value is written at a location given by (word-direction address, bit-direction number=(60s+u, w) to a time at which a received value is written at a location given by (word-direction address, bit-direction number (60s+u+1, w), where $0 \leq s \leq 2$, $0 \leq u \leq 59$, and $0 \leq w \leq 359$.

On the other hand, the first position in the parity part is given by (word-direction number, bit-direction number)=$(k_0, 0)$, and a received value written at (word-direction number, bit-direction number)=$(120, 0)$ is a received value having a 2nd arrival number. Therefore, the received value written at the first position in the parity part is a received value having an arrival number of $1080 \times (k_0 - 120) + 2$.

Thus, when a received value of an arrival number indicating the arrival order which has a remainder of 2 when divided by 3 and which is smaller than $1080 \times (k_0 - 120) + 2$, this received value is written at a location whose word-direction address is smaller than $k_0$, and thus this received value belongs to the information part.

Those received values having such arrival numbers indicating the arrival order to the receiving unit 302 are written, as with the received values having an arrival number which leads to no remainder or a remainder of 1 when divided by 3, in the horizontal direction (word direction) at intervals of $n_0/3=60$ words in the information part of the received value memory 351 in the order represented by solid arrows shown in FIG. 23. When the data is read out as data elements of the output codeword from the received value memory 351, the reading is performed in parallel in a vertical direction on a word-by-word basis (that is, one data element is read from each column Ru (see FIG. 23) at a time). Therefore, received values received at adjacent times are read at an interval corresponding to $64800/3=21600$ pieces of received values. Thus, the bit deinterleaving for the information part of the received word is achieved.

On the other hand, when a received value of an arrival number indicating the arrival order which has a remainder of 2 when divided by 3 and which is greater than $1080 \times (k_0 - 120) + 2$, this received value is written at a location whose word-direction address is greater than $k_0$, and thus this received value belongs to the parity part.

Herein, let i be an integer in a range $0 \leq i \leq P-1=359$, and let j be an integer in a range $0 \leq j \leq n_0-1-k_0$. When a received value has an arrival number equal to $1080 \times (k_0-120)+2+3 \times (n_0-k_0) \times i+3 \times j$, the arrival number has a remainder of 2 when divided by 3 and the arrival number is greater than $1080 \times (k_0-120)+2$. Therefore, such a received value is written in the parity part storage area (the storage area for storing the parity part of the output codeword) of the received value memory 351.

A more detailed explanation is provided below in terms of specific locations at which received values corresponding to the parity part are written in the parity part storage area of the received value memory 351.

In the following discussion, it is assumed that a received value written at the first location in the parity part storage area is numbered 0, and received values which are written thereafter in the parity part are extracted from incoming received values, that is, received values having arrival numbers given by $1080 \times (k_0-120)+2+3 \times (n_0-k_0) \times i+3 \times j$ are extracted and numbered values incremented by 1 each time one received value is extracted. Hereinafter, such a number will be referred to as a parity writing number.

When received values have arrival numbers equal to $1080 \times (k_0-120)+2+3 \times (n_0-k_0) \times i+3 \times j$, the received values have parity writing numbers equal to $i \times (n_0-k0)+j$ and thus are written in the order of $i \times (n_0-k0)+j$ in the parity part storage area of the received value memory 351 shown in FIG. 23.

For example, when received values have arrival numbers equal to $1080 \times (k_0-120)+2+3 \times (n_0-k_0) \times 0+3 \times 0 = 1080 \times (k_0-120)+2$, $1080 \times (k_0-120)+2+3 \times (n_0-k_0) \times 0+3 \times 1 = 1080 \times (k_0-120)+5, \ldots, 1080 \times (k_0-120)+2+3 \times (n_0-k_0) \times 1+3 \times 1$, they have parity writing numbers equal to $0, 1, \ldots, n_0-k_0+1$, and thus they are written in this order in the parity part storage area of the received value memory 351 shown in FIG. 23.

As described above, from the point of view of the parity writing number, the parity permutation is equivalent to the process of relocating the data of serial numbers given by $(n_0-k_0) \times i+j (0 \leq i \leq P-1=359, 0 \leq j \leq n_0-k_0-1)$ to positions of $P \times j+i=359 \times j+i$.

Figure 24:
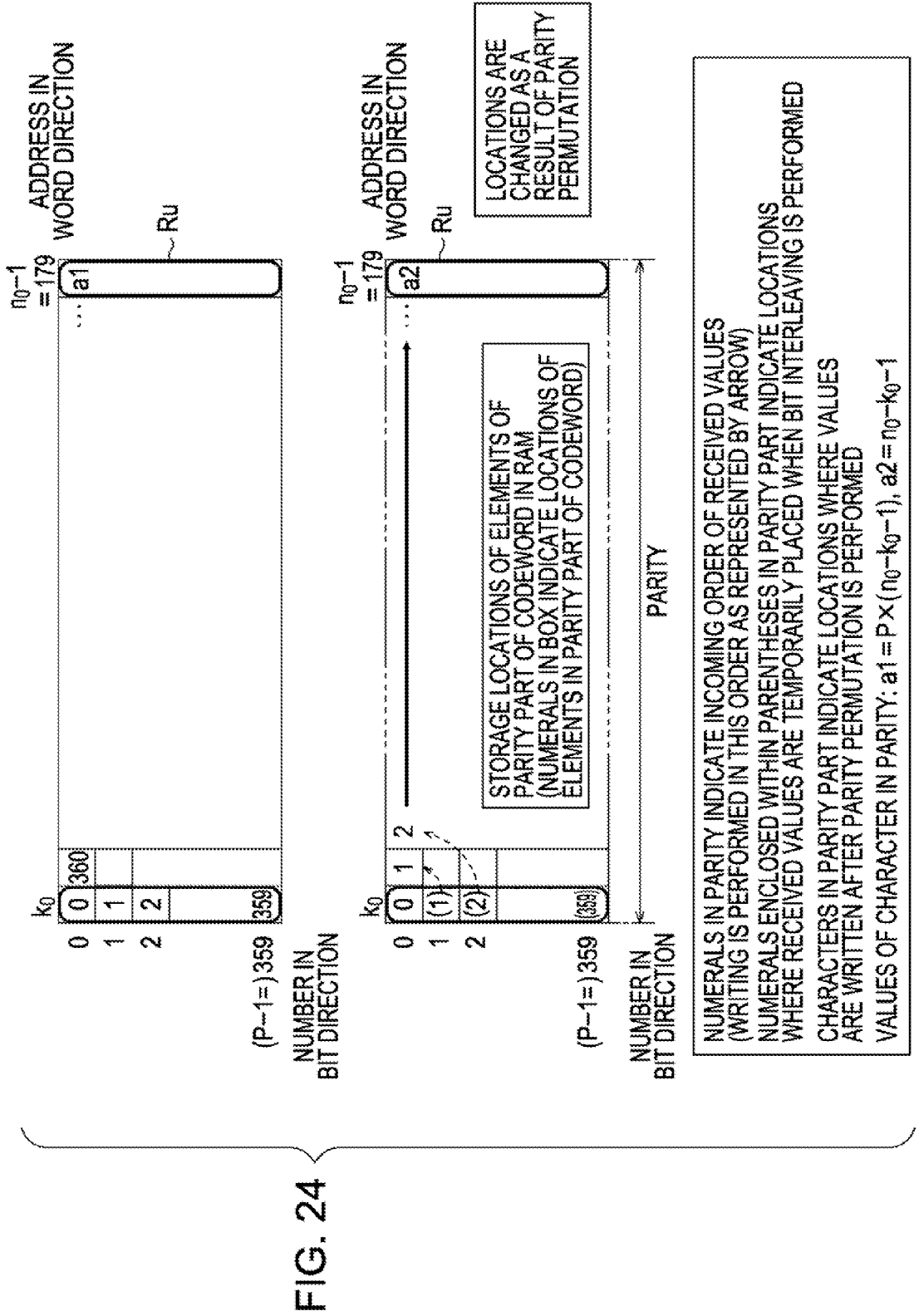
FIG. 24 is a diagram illustrating a received value writing method including a bit deinterleaving process and a parity permutation process performed simultaneously on received values.

From the point of view of the serial numbers of data elements of the codeword output from the received value memory 351 shown in FIG. 23, as shown in the diagram on the top of FIG. 24, data elements are sequentially stored in the received value memory 351 in ascending order of the bit-direction number, and thus data elements at locations $P \times j+i$ in the parity part correspond to data element at locations $k_0+j$ in word-direction address and i in bit-direction number where $0 \leq j \leq n_0-k_0-1$ and $0 \leq i \leq 359=P-1$.

Thus, if received values to be written in the parity part in the order of parity writing number $(n_0-k_0) \times i+j$, $(n_0-k_0) \times i+j+1$, . . . are written at locations of $k_0+j$, $k_0+j+1$, . . . in word-direction address and i, i, . . . in bit-direction number on the received value memory 351 as shown in FIG. 23, that is, if received values corresponding to the parity part are sequentially written in the word direction, parity permutation is achieved.

For example, received values received in an order corresponding to parity writing numbers of $0, 1, \ldots, n_0-k_0-1, \ldots$ are written in the received value memory 351 at locations $k_0+0, k_0+0+1, \ldots, n_0-1, \ldots$ in word-direction address and $0, 0, \ldots$, in bit-direction number, in the order denoted by numerals not enclosed in parentheses in the diagram on the bottom of FIG. 24. As a result, received values written in the parity part in the order of parity writing number $(n_0-k_0) \times i+j$, $(n_0-k_0) \times i+j+1, \ldots$ are located in the order $P \times j+i$, $P \times (j+1)+i$, . . . , and thus parity permutation is achieved.

By employing the scheme described above, the bit deinterleaving and the parity permutation are achieved at the same time for general 8PSK data with an arbitrary coding rate r.

Note that by specifying the addresses at which to write received values in the above described manner, the bit deinterleaving and the parity permutation can be simultaneously achieved without having to use a separate apparatus dedicated to the bit deinterleaving, and thus it is possible to reduce the circuit complexity and power consumption without creating any disadvantage.

In the embodiments described above, the bit deinterleaving and the parity permutation are carried out at the same time on the single received value memory (the received value memory 331 shown in FIG. 21 or received value memory 351 shown in FIG. 23) of the receiving unit 302, and thus a dedicated bit deinterleaver, which will be necessary if the present invention is not used, is no longer necessary and thus two RAMs of the bit deinterleaver (for example, the storage devices 221 and 222 (FIG. 10) in the bit deinterleaver 203 (FIG. 6)) can be removed.

Although a further description is not given herein, the technique disclosed above can be used also for other modulation schemes or other coding rates. That is, the present invention can be embodied in various ways, and various modifications are possible without departing from the spirit and the scope of the present invention. Thus, it should be understood that the detailed descriptions and the drawings have been provided above by way of example but not limitation.

The sequence of processing steps described above may be performed by hardware or software.

By performing the processing sequence by executed software on a computer, it is possible to implement the decoder on the computer.

As shown in FIG. 25, a CPU (Central Processing Unit) 501 performs various processes in accordance with a program stored in a ROM (Read Only Memory) 502 or in accordance with a program loaded into a RAM (Random Access Memory) 503 from a storage unit 508. The RAM 503 is also used to store data used by the CPU 501 in the execution of various processes.

The CPU 501, the ROM 502, and the RAM 503 are connected to each other via a bus 504. The bus 504 is also connected to an input/output interface 505.

The input/output interface 505 is also connected to an input unit 506 including a keyboard, mouse, and the like, an output unit 507 including a display, a storage unit 508 such as a hard disk, and a communication unit 509 such as a modem or a terminal adapter. The communication unit 509 serves to perform communication with another apparatus (not shown) via a network such as the Internet.

Furthermore, the input/output interface 505 is also connected with a drive 510, as required. A removable medium 511 such as a magnetic disk, an optical disk, a magnetooptical disk, or a semiconductor memory is mounted on the drive 510 as required, and a computer program is read from the removable medium 511 and installed into the storage unit 508 as required.

When the processing sequence is executed by software, a program forming the software may be installed from a storage medium or via a network onto a computer which is provided as dedicated hardware or may be installed onto a general-purpose computer capable of performing various processes in accordance with various programs installed thereon.

Specific examples of storage media 511 usable for the above purpose include, as shown in FIG. 25, a magnetic disk (such as a floppy disk), an optical disk (such as a CD-ROM (Compact Disk-Read Only Memory) and a DVD (Digital Versatile Disk)), a magnetooptical disk (such as an MD (Mini-Disk, trademark)), and a semiconductor memory, in the form of a package medium in which a program is stored and which is supplied to a user separately from a computer. A program may also be supplied to a user by preinstalling it on a built-in ROM 502 or a storage unit 508 such as a hard disk disposed in the computer.

In the present description, the steps described in the program stored in the storage medium may be performed either in time sequence in accordance with the order described in the program or in a parallel or separate fashion.

In the present description, the term "system" is used to describe the entirety of an apparatus including a plurality of sub-apparatuses or units.

It should be understood by those skilled in the art that various modifications, combinations, sub-combinations and alterations may occur depending on design requirements and other factors insofar as they are within the scope of the appended claims or the equivalents thereof.

What is claimed is:

1. A decoding apparatus adapted to decode data in units of codewords each including a parity part, comprising:
    storage means having a storage capacity capable of storing at least data with a length equal to the length of one codeword; and
    receiving means for receiving, as received values, elements of a codeword in a bit-interleaved form, simultaneously performing bit deinterleaving and parity permutation on the received values, and storing the resultant received values in the storage means, wherein the bit deinterleaving is performed by writing in the storage means the received values received at immediately adjacent times spaced by a distance corresponding to the number of received values.

2. The decoding apparatus according to claim 1, wherein the received values corresponding to the elements of the codeword are serially input to the receiving means.

3. The decoding apparatus according to claim 1, wherein the storage means is configured to store each received value at any specified storage location.

4. The decoding apparatus according to claim 1, wherein each received value is in the form of a soft value.

5. The decoding apparatus according to claim 1, wherein the decoding apparatus is adapted to decode an LDPC (Low Density Parity-Check code) code.

6. The decoding apparatus according to claim 1, wherein the storage means includes a RAM (Random Access Memory).

7. A decoding method for a decoding apparatus adapted to decode data in units of codewords each including a parity part, comprising the steps of, in the decoding apparatus including a memory having a storage capacity capable of storing at least data with a length equal to the length of one codeword,
    receiving, as received values, elements of a codeword in a bit-interleaved form;
    simultaneously performing bit deinterleaving and parity permutation on the received values, wherein the bit deinterleaving is performed by writing in the storage means the received values received at immediately adjacent times spaced by a distance corresponding to the number of received values; and
    storing the resultant received values in the memory.

8. A non-transitory computer-readable medium storing a program executable by a computer to perform a process of decoding data in units of codewords each including a parity part, the process including the steps of,
    receiving, as received values, elements of a codeword in a bit-interleaved form;
    simultaneously performing bit deinterleaving and parity permutation on the received values, wherein the bit deinterleaving is performed by writing in the storage means the received values received at immediately adjacent times spaced by a distance corresponding to the number of received values; and
    storing the resultant received values in a memory disposed in the computer or any other apparatus and having a storage capacity capable of storing at least data with a length equal to the length of one codeword.

9. A decoding apparatus adapted to decode data in units of codewords each including a parity part, comprising:
    a memory having a storage capacity capable of storing at least data with a length equal to the length of one codeword; and
    a receiving unit adapted to receive, as received values, elements of a codeword in a bit-interleaved form, simultaneously performing bit deinterleaving and parity permutation on the received values, wherein the bit deinterleaving is performed by writing in the storage means the received values received at immediately adjacent times spaced by a distance corresponding to the number of received values, and
    storing the resultant received values in the memory.

* * * * *